US012770539B2

(12) United States Patent
Li et al.

(10) Patent No.: US 12,770,539 B2
(45) Date of Patent: Oct. 20, 2026

(54) DISPLAY PANEL AND DISPLAY DEVICE

(71) Applicant: Tianma Advanced Display Technology Institute (Xiamen) Co., Ltd., Xiamen (CN)

(72) Inventors: Xueling Li, Xiamen (CN); Zhenyu Jia, Xiamen (CN); Wenxin Jiang, Xiamen (CN); Tianyi Wu, Xiamen (CN); Kerui Xi, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 19/066,186

(22) Filed: Feb. 28, 2025

(65) Prior Publication Data

US 2026/0120599 A1 Apr. 30, 2026

(30) Foreign Application Priority Data

Oct. 31, 2024 (CN) ........................ 202411547289.9

(51) Int. Cl.
*G06F 3/038* (2013.01)
*G09G 3/00* (2006.01)

(52) U.S. Cl.
CPC ..... *G09G 3/006* (2013.01); *G09G 2300/0408* (2013.01); *G09G 2300/0426* (2013.01); *G09G 2300/0804* (2013.01); *G09G 2310/0267* (2013.01); *G09G 2310/0286* (2013.01); *G09G 2330/04* (2013.01); *G09G 2330/06* (2013.01); *G09G 2330/12* (2013.01)

(58) Field of Classification Search
CPC ........... G09G 3/006; G09G 2300/0408; G09G 2300/0426
USPC ........................................................ 345/205
See application file for complete search history.

(56) References Cited

U.S. PATENT DOCUMENTS

| | | | | |
|---|---|---|---|---|
| 2017/0117341 A1* | 4/2017 | Chen | H10K 59/123 |
| 2023/0075783 A1* | 3/2023 | Cha | G09G 3/20 |
| 2023/0222969 A1* | 7/2023 | Peng | G09G 3/32 345/55 |
| 2023/0246038 A1* | 8/2023 | Lou | G09G 3/32 257/88 |
| 2024/0321185 A1* | 9/2024 | Dai | G09G 3/32 |
| 2024/0321220 A1* | 9/2024 | Wang | G09G 3/3225 |

FOREIGN PATENT DOCUMENTS

CN 119274464 A 1/2025

* cited by examiner

*Primary Examiner* — Jonathan M Blancha
(74) *Attorney, Agent, or Firm* — Anova Law Group, PLLC

(57) ABSTRACT

The present disclosure discloses a display panel, including a pixel driving circuit array, a shift register circuit, a gating circuit, a pixel driving line, and a data line. The pixel driving circuit array includes a plurality of pixel driving circuits. The pixel driving line is electrically connected and configured to transmit a control signal to the pixel driving circuits. The data line is electrically connected and configured to transmit a data signal to the pixel driving circuits. The shift register circuit is configured to transmit the control signal to the pixel driving line, and the gating circuit is configured to transmit the data signal to the data line. The shift register circuit includes a plurality of shift registers, which are cascaded and include a plurality of first shift registers and a second shift register. The gating circuit is located between the pixel driving circuit array and the second shift register.

20 Claims, 18 Drawing Sheets

DISPLAY PANEL AND DISPLAY DEVICE

CROSS-REFERENCES TO RELATED APPLICATIONS

The present disclosure claims priority to Chinese Patent Application No. 202411547289.9, filed on Oct. 31, 2024, the content of which is incorporated herein by reference in its entirety.

TECHNICAL FIELD

The present disclosure relates to the field of display technology, and more specifically, relates to a display panel and a display device.

BACKGROUND

With the continuous development of science and technology, display products, such as mobile phones, tablet computers, notebook computers, and smart wearable devices, have been widely used nowadays, bringing great convenience and becoming an indispensable important tool in modern life.

Existing display products may include circuits typically. How to reasonably arrange those circuits to reduce interference between different signals has become one of the urgent technical problems to be solved at present.

SUMMARY

One aspect of the present disclosure provides a display panel. The display panel includes a pixel driving circuit array, a shift register circuit, a gating circuit, a pixel driving line, and a data line. The pixel driving circuit array includes a plurality of pixel driving circuits. The pixel driving line and the data line are respectively electrically connected to the plurality of pixel driving circuits, the pixel driving line is configured to transmit a control signal to the plurality of pixel driving circuits, and the data line is configured to transmit a data signal to the plurality of pixel driving circuits. The shift register circuit is configured to transmit the control signal to the pixel driving line, and the gating circuit is configured to transmit the data signal to the data line. The shift register circuit includes a plurality of shift registers that are cascaded. The plurality of shift registers include a plurality of first shift registers and a second shift register cascaded with the plurality of first shift registers. The plurality of first shift registers are cascaded and located in a region where the pixel driving circuit array is located. The second shift register is located on a side of the pixel driving circuit array facing an edge of the display panel. The gating circuit is located between the pixel driving circuit array and the second shift register.

Another aspect of the present disclosure provides a display device. The display device includes a display panel, where the display panel includes a pixel driving circuit array, a shift register circuit, a gating circuit, a pixel driving line, and a data line. The pixel driving circuit array includes a plurality of pixel driving circuits. The pixel driving line and the data line are respectively electrically connected to the plurality of pixel driving circuits, the pixel driving line is configured to transmit a control signal to the plurality of pixel driving circuits, and the data line is configured to transmit a data signal to the plurality of pixel driving circuits. The shift register circuit is configured to transmit the control signal to the pixel driving line, and the gating circuit is configured to transmit the data signal to the data line. The shift register circuit includes a plurality of shift registers that are cascaded. The plurality of shift registers include a plurality of first shift registers and a second shift register cascaded with the plurality of first shift registers. The plurality of first shift registers are cascaded and located in a region where the pixel driving circuit array is located. The second shift register is located on a side of the pixel driving circuit array facing an edge of the display panel. The gating circuit is located between the pixel driving circuit array and the second shift register.

BRIEF DESCRIPTION OF THE DRAWINGS

The drawings provided herein are incorporated into the specification and form a part of the specification, illustrating embodiments in accordance with the present disclosure and are used, together with the specification, to explain the principles of the present disclosure.

To more clearly illustrate the embodiments of the present disclosure, a brief introduction to the drawings used in the description of the embodiments is provided below. It is evident to those skilled in the art that additional drawings may be derived based on these drawings without inventive effort.

DETAILED DESCRIPTION

To more clearly understand the above-described objectives, features, and advantages of the present disclosure, the solutions provided by the present disclosure are further described below. It should be noted that, when not in conflict, the embodiments of the present disclosure and the features included in the embodiments may be combined with one another.

In the following description, many specific details are set forth to facilitate a thorough understanding of the present disclosure. However, the present disclosure may also be implemented in other ways different from those described herein. Evidently, the embodiments described in the specification represent only some embodiments of the present disclosure and not all of the embodiments.

Figure 1:
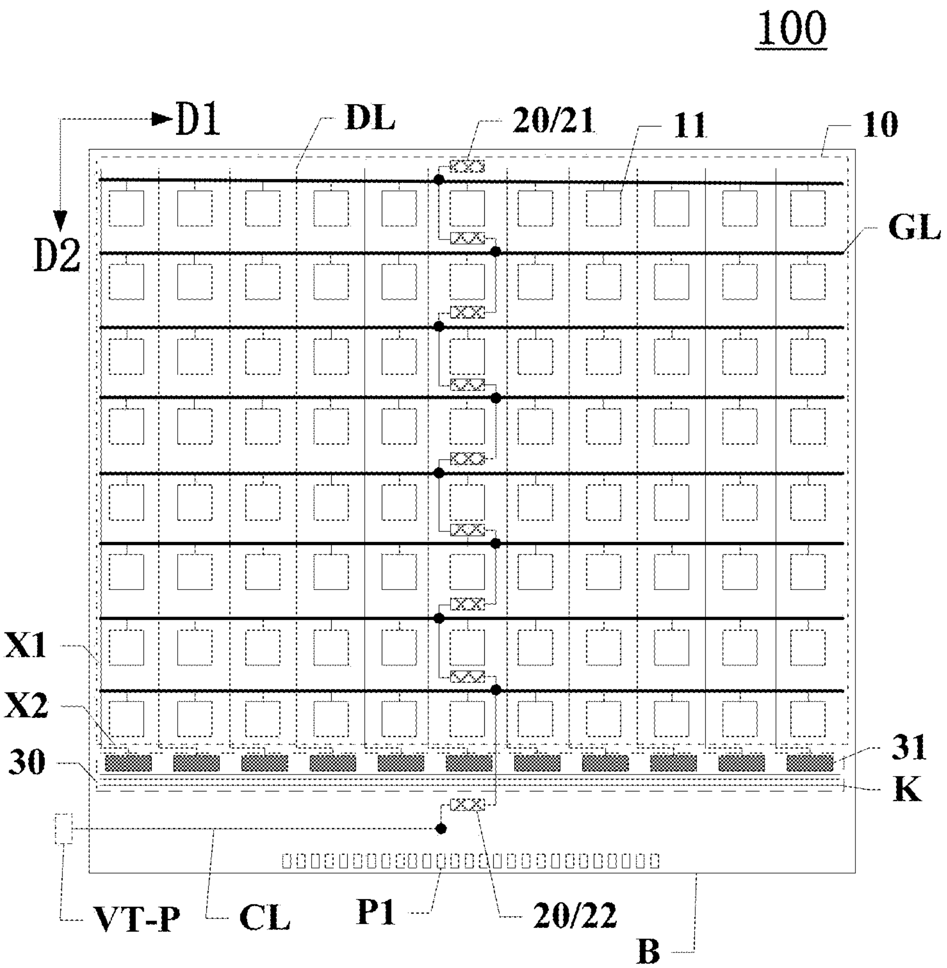
FIG. 1 illustrates a planar structural diagram of a display panel in accordance with some embodiments of the present disclosure.

FIG. 1 illustrates a planar structural diagram of a display panel in accordance with some embodiments of the present disclosure. Referring to FIG. 1, a display panel 100 provided by the present disclosure includes a pixel driving circuit array 10, a shift register circuit 20, a gating circuit 30, a pixel driving line GL, and a data line DL. The pixel driving circuit array 10 includes a plurality of pixel driving circuits 11. It should be noted that FIG. 1 merely schematically illustrates the relative positional relationships among the pixel driving circuit array 10, the shift register circuit 20, and the gating circuit 30. It does not limit the number or arrangement of pixel driving circuits 11 actually included in the pixel driving circuit array 10, nor does it limit the number of shift registers actually included in the shift register circuit 20.

In the display panel 100 provided by the present disclosure, the pixel driving line GL and the data line DL are respectively electrically connected to the pixel driving circuit 11. The pixel driving line GL is configured to transmit a control signal to the pixel driving circuit 11. For example, the control signal may be a reset signal for resetting the pixel driving circuit 11, a control signal for writing data to the pixel driving circuit 11, or a light-emission control signal for controlling the pixel driving circuit 11 to emit light. It should be noted that FIG. 1 only illustrates one pixel driving line GL connected to the pixel driving circuit 11, but it does not limit the number of pixel driving lines GL actually connected to the pixel driving circuit 11. In the present disclosure, the data line DL is configured to transmit a data signal to the pixel driving circuit 11. The shift register circuit 20 is configured to transmit a control signal to the pixel driving line GL, and the pixel driving line GL further transmits the control signal to the pixel driving circuit 11. The gating circuit 30 is configured to transmit a data signal to the data line DL, and the data line DL further transmits the data signals to the pixel driving circuit 11.

Figure 2:
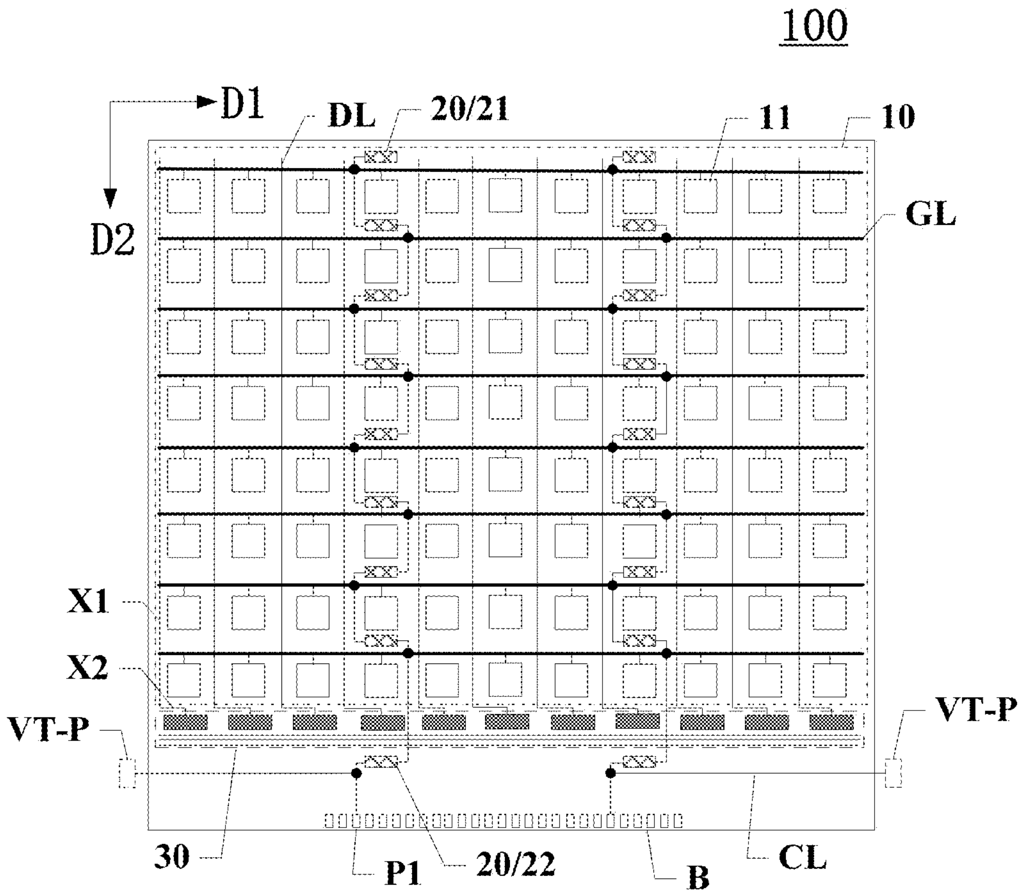
FIG. 2 illustrates another planar structural diagram of a display panel in accordance with some embodiments of the present disclosure.

In the present disclosure, the shift register circuit 20 includes a plurality of cascaded shift registers. The shift registers include a plurality of cascaded first shift registers 21 and a second shift register 22 cascaded with the first shift registers 21. The first shift registers 21 are located in a region where the pixel drive circuit array 10 is located, while the second shift register 22 are located on the side of the pixel driving circuit array 10 facing the edge B of the display panel. The gating circuit 30 is located between the pixel driving circuit array 10 and the second shift register 22. According to some embodiments of the present disclosure, as shown in FIG. 1, the pixel driving circuit array 10 includes a plurality of pixel driving circuits 11 arranged in a matrix. In this case, the region where the pixel driving circuit array 10 is located may be regarded as a rectangular region formed by all the pixel driving circuits 11. In the present disclosure, the first shift registers 21 are located within the rectangular region formed by the pixel driving circuit array 10, and the second shift registers 22 are located outside the rectangular region. It should be noted that the rectangular region formed by the pixel driving circuit array 10 in FIG. 1 is only schematic and is not limited thereto. In some other embodiments of the present disclosure, the region where the pixel driving circuit array 10 is located may take other non-rectangular shapes. Furthermore, FIG. 1 illustrates only one set of shift register circuits 20 in the display panel, and the number of shift register circuits 20 actually included in the display panel is not limited. For example, FIG. 2 illustrates a planar structural diagram of a display panel in accordance with some embodiments of the present disclosure. The embodiment disclosed in FIG. 2 shows two sets of shift register circuits 20 in the display panel. In these circuits, the first shift registers 21 are all located in the region where the pixel driving circuit array 10 is located, and the second shift registers 22 are located on the side of the pixel driving circuit array 10 facing the edge B of the display panel. It should be noted that the two sets of shift register circuits 20 may transmit control signals to the same pixel driving line GL to enhance the driving capability of the control signals, or they may transmit control signals to different pixel driving lines GL, which is not specifically limited in the present disclosure.

Figure 3:
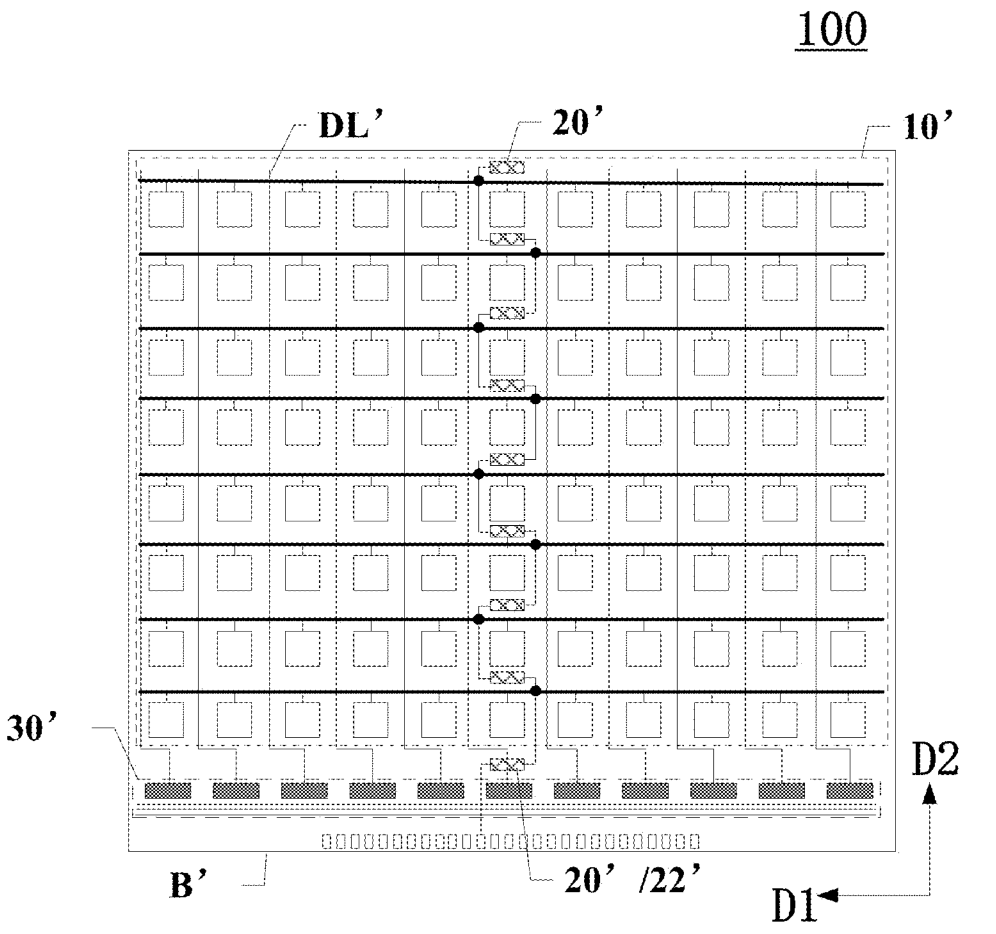
FIG. 3 illustrates a planar structural diagram of a display panel.

In the process of designing the display panel, the inventors have found an implementation method as shown in FIG. 3, where all shift registers in the shift register circuit 20' are placed in the region where the pixel driving circuit array 10' is located, and the gating circuit 30' is placed outside the pixel driving circuit array 10'. That is, the gating circuit 30' is located on the side of the shift register circuit 20' facing the edge B' of the display panel. FIG. 3 illustrates a planar structural diagram of a display panel. However, the inventors found that, in the configuration shown in FIG. 3, the data signals on the data line DL' are subject to interference from other signals. This interference occurs because the data line DL' must pass through the level of the shift register closest to the gating circuit 30' when connecting to the gating circuit 30'. When the data line DL' and the signal line corresponding to the shift register are on the same layer, signal interference may occur. Further research revealed that to reduce the interference from the shift registers to the data line DL', a re-routing design could be applied to the data line DL' near the location of the shift register closest to the gating circuit 30'. This would avoid having the data line DL' and the signal line corresponding to the shift register on the same layer. However, since the data line DL' is relatively thin, such a re-routing design increases the risk of disconnection or short circuits, affecting the display performance.

To address the above issues, the present disclosure adjusts the positional relationship between the shift registers and the gating circuit 30 relative to the pixel driving circuit array 10. Specifically, referring to FIGS. 1 and 2, a plurality of first shift registers 21 in the shift register circuit 20 are placed in the region where the pixel driving circuit array 10 is located, and the second shift registers 22 cascaded with the first shift registers 21 are placed outside the region of the pixel driving circuit array 10. That is, the second shift registers 22 are placed on the side of the pixel driving circuit array 10 facing the edge B of the display panel. In this embodiment, the edge B of the display panel refers to the lower edge of the display panel. At this point, both the second shift registers 22 and the gating circuit 30 are located on the side of the pixel driving circuit array 10 facing the edge B of the display panel, and the second shift registers 22 are located between the gating circuit 30 and the edge B of the display panel. That is, the gating circuit 30 is closer to the pixel driving circuit array 10 than the second shift registers 22, so that the gating circuit 30 is closer to the end of the data line DL. In this configuration, the connection between the end of the data line DL and the gating circuit 30 does not need to pass through the second shift register 22, thus avoiding signal interference from the second shift registers 22 to the data line DL. This arrangement improves the accuracy of the data signals transmitted on the data line DL. Additionally, by placing the gating circuit 30 between the second shift registers 22 and the pixel driving circuit array 10, there is no interference from other circuits between the data line DL and the gating circuit 30. The data line DL may connect to the gating circuit 30 without requiring re-routing, thus avoiding the risk of disconnection or short circuits due to re-routing. This is beneficial to improving the display stability of the display panel.

Figure 4:
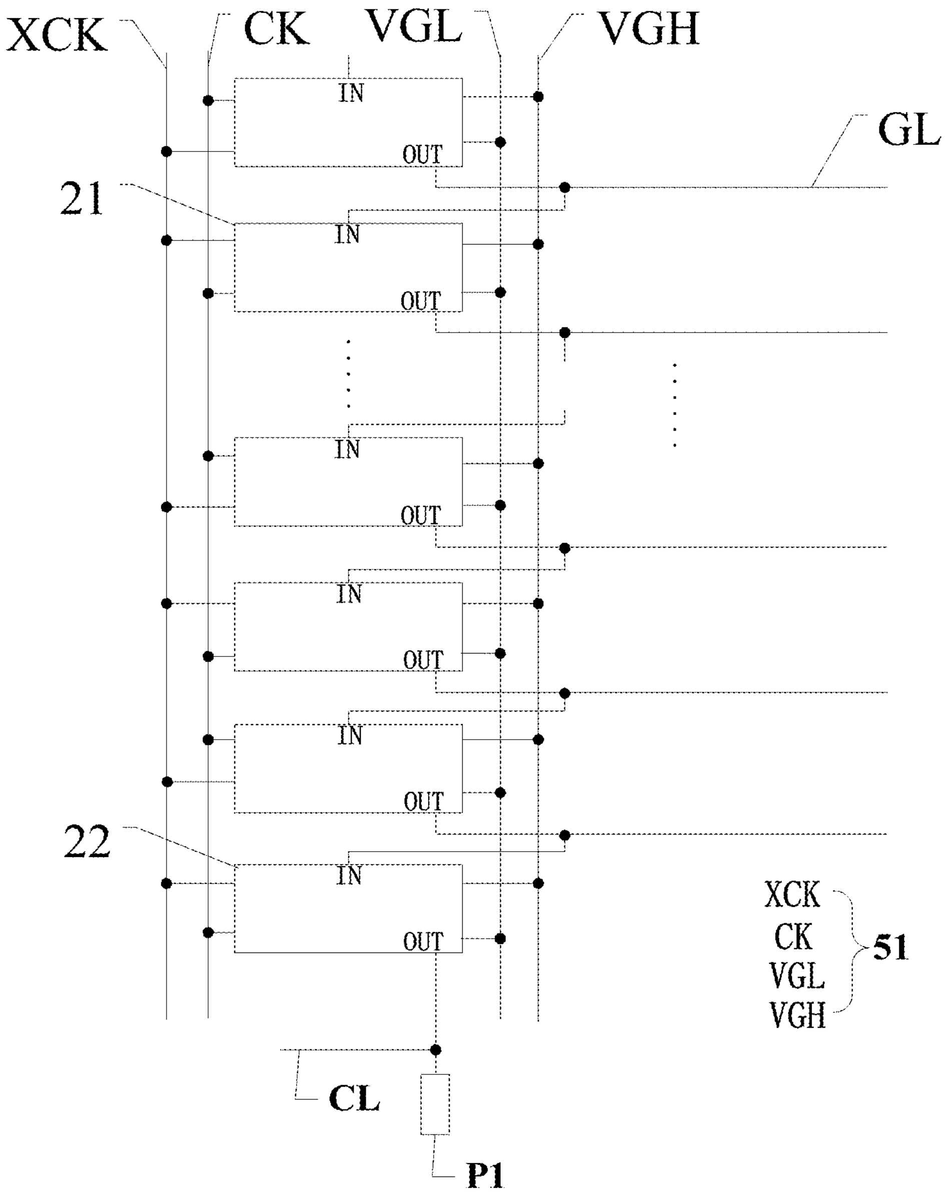
FIG. 4 illustrates a schematic diagram of a connection for a shift register circuit in accordance with some embodiments of the present disclosure.

FIG. 4 illustrates a schematic diagram of a connection in the shift register circuit 20 in accordance with some embodiments of the present disclosure. Referring to FIGS. 1, 2, and 4, in one optional embodiment of the present disclosure, the output terminal OUT of the first shift register 21 is electrically connected to the pixel driving circuit 11 via the pixel driving line GL. The display panel further includes a bonding pad P1, and the output terminal OUT of the second shift register 22 is electrically connected to the bonding pad P1. In other words, the first shift register 21 mentioned in the embodiment of the present disclosure is a shift register connected to the pixel driving line GL and configured to provide control signals to the pixel driving circuit 11 through the pixel driving line GL. The second shift register 22, on the other hand, may be regarded as a virtual shift register, where its output terminal OUT is not connected to the pixel driving line GL but is instead connected to the bonding pad P1 in the display panel. The second shift register 22 does not need to provide control signals to the pixel driving line GL in the display panel.

Optionally, referring to FIGS. 1, 2, and 4, the display panel further includes a test signal line CL, and the output terminal of the second shift register 22 is also electrically connected to the test signal line CL.

The bonding pad P1 introduced into the display panel is used for bonding with a control chip or a flexible circuit board, thereby achieving electrical connection between the control chip or the flexible circuit board and the bonding pad P1 and further achieving electrical connection with the circuits in the display panel. The display panel is formed by cutting from a mother board. Before cutting, a test pad VT-P is provided on the mother board, where the test pad VT-P is electrically connected to the test signal line CL in the display panel and is used for detecting corresponding signals. For example, the output terminal OUT of the second shift register 22 is electrically connected to the test signal line CL, allowing testing of the signals of the second shift register 22 before cutting. During testing, a test probe contacts the test pad VT-P to detect the signal at the output terminal of the second shift register 22, thereby determining whether there is an abnormality in the control signals output by the shift register circuit 20. The test pad VT-P does not need to be bonded to the control chip or flexible circuit board. Optionally, the test pad VT-P is cut off when forming the display panel by cutting.

Figure 5:
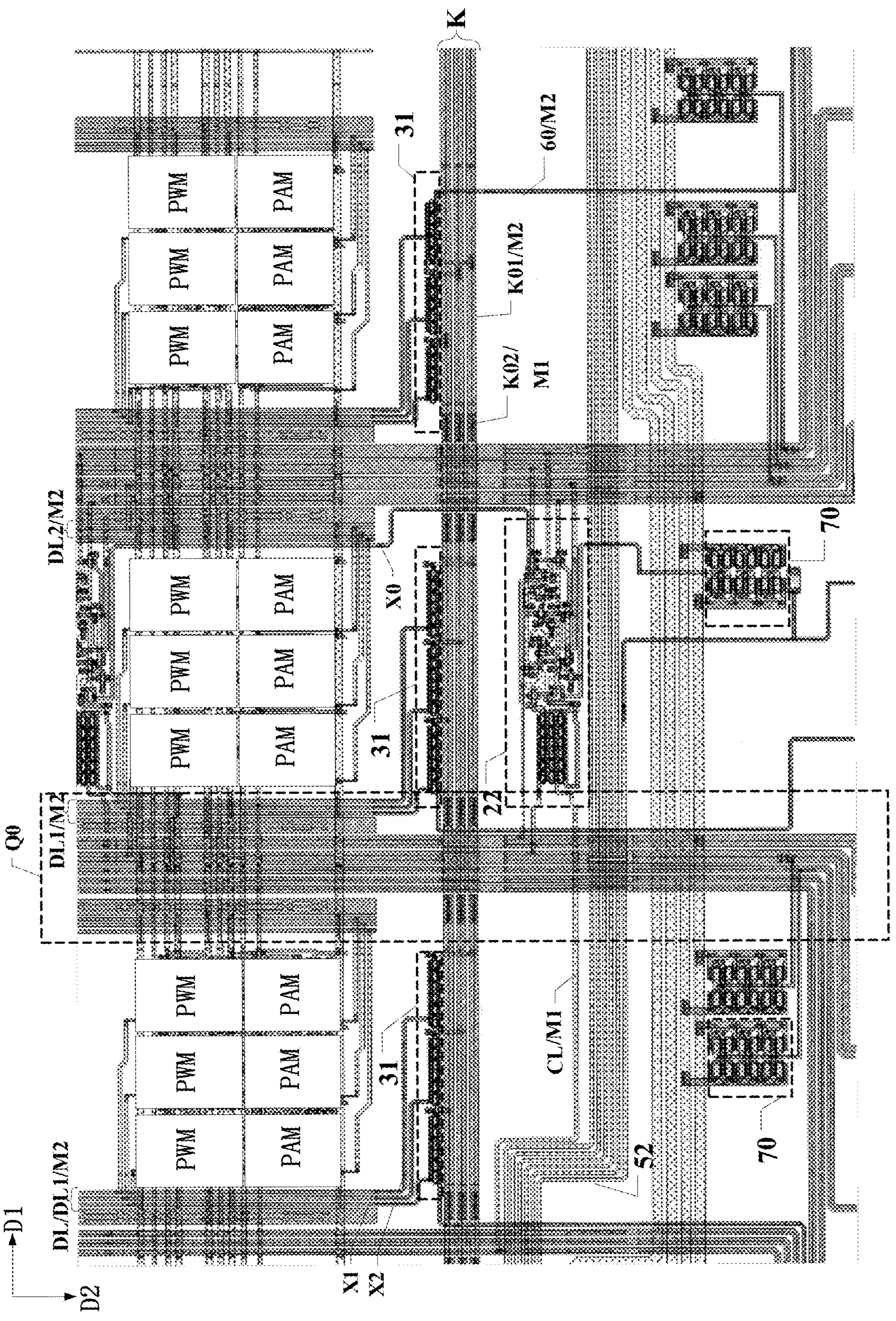
FIG. 5 illustrates a layout diagram of a pixel driving circuit, a gating circuit, and a shift register circuit.
Figure 6:
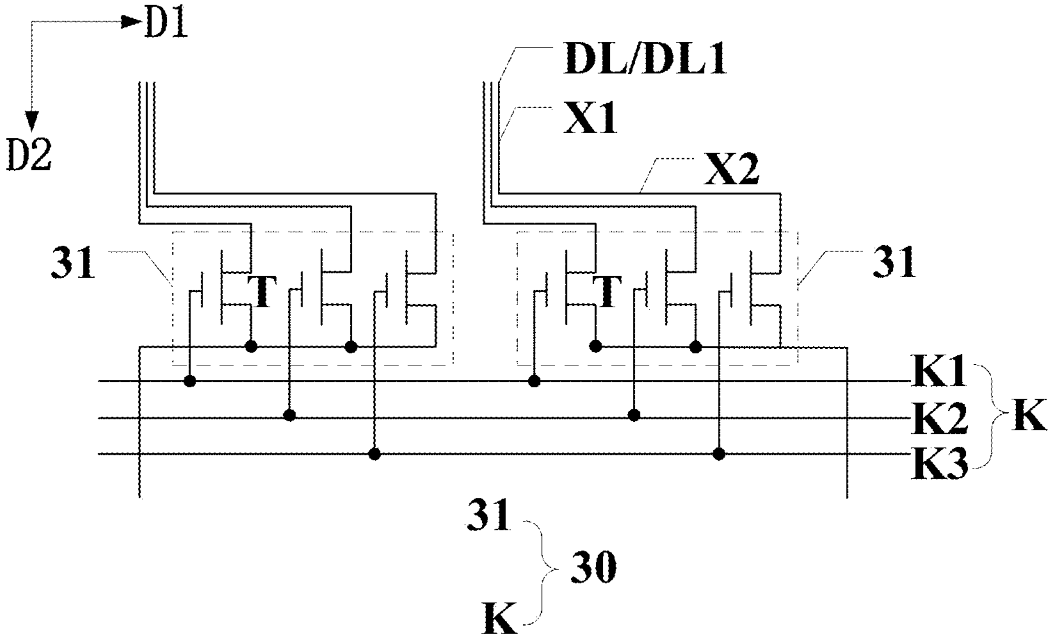
FIG. 6 illustrates a circuit diagram of a connection between a data line and a gating circuit.
Figure 7:
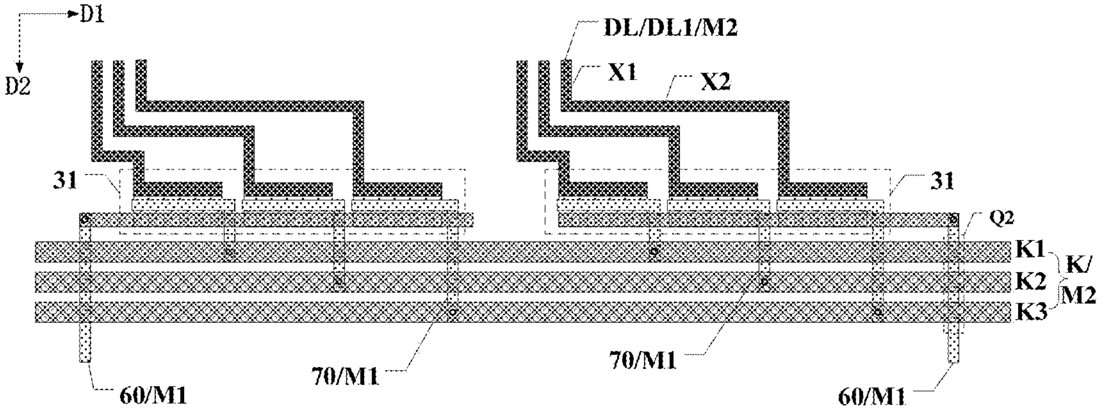
FIG. 7 illustrates a layout diagram of a connection between a data line and a gating circuit.

FIG. 5 illustrates a layout diagram of a pixel driving circuit, a gating circuit, and a shift register circuit. FIG. 6 illustrates a circuit diagram of the connection between the data line DL and the gating circuit 30. FIG. 7 illustrates a layout diagram of the connection between the data line DL and the gating circuit 30. Referring to FIGS. 5, 6, and 7, in one optional embodiment of the present disclosure, the gating circuit 30 includes a plurality of switch element groups 31. The switch element group 31 includes at least two switch elements T, and the output terminals of the switch elements T are electrically connected to the data line DL. Referring to FIGS. 1 and 2, the data line DL includes a first portion X1 and a second portion X2 that are electrically connected. The first portion X1 is at least located in the region where the pixel driving circuit array 10 is situated, and the second portion X2 is located on the side of the pixel driving circuit array 10 facing the edge B of the display panel. The first portion X1 is electrically connected to the switch elements T through the second portion X2, and the first portion X1 and the second portion X2 are disposed in the same layer.

In the embodiments illustrated in FIGS. 6 and 7, the switch element group 31 in the gating circuit 30 includes three switch elements T as an example, but this is not limiting. In the display panel, the output terminals of the switch elements T in the switch element group 31 are electrically connected to the data line DL on a one-to-one basis to transmit data signals to the data line DL. In this embodiment, the first portion X1 of the data line DL may be regarded as the segment of the data line DL located in the region where the pixel driving circuit array 10 is situated, and the second portion X2 may be regarded as the segment used to electrically connect the first portion X1 with the switch elements T in the gating circuit 30. When the switch element group 31 is not positioned directly below the first portion X1 of the data line DL, the electrical connection between the first portion X1 and the switch elements T in the switch element group 31 may be achieved by introducing the second portion X2 positioned directly above the switch element group 31. At least part of the segments in the second portion X2 extend in a direction different from at least part of the segments in the first portion X1. In this embodiment, the first portion X1 extends in the second direction D2, while at least part of the segments in the second portion X2 extend in the first direction D1 as an example. In this embodiment, when the first portion X1 and the second portion X2 of the data line DL are set in the same layer, the electrical connection between the data line DL and the switch element group 31 may be achieved without requiring re-routing of the data line DL. This approach avoids the risk of disconnection or short circuits caused by re-routing and eliminates the need for additional processes like drilling holes when the two portions are placed in different layers. This simplifies the manufacturing process of the data line DL.

Referring to FIGS. 5, 6, and 7, in some embodiments of the present disclosure, the gating circuit 30 includes at least two gating control lines K. As an example, the gating circuit 30 includes three gating control lines K (namely, the first gating control line K1, the second gating control line K2, and the third gating control line K3). The number of gating control lines K is the same as the number of switch elements in a single switch element group 31. In the same switch element group 31, the gates of different switch elements are connected to different gating control lines K. The gating control lines K extend along the first direction D1, while the first portion X1 of the data line DL extends along the second direction D2. The first direction D1 and the second direction D2 intersect. Referring to FIGS. 1 and 2, along the second direction D2, the switch element group 31 is located between the gating control lines K and the pixel driving circuit array 10. The three gating control lines K in the gating circuit 30 send enable signals in a time-division manner to turn on the connected switch elements T. When the switch elements T are turned on, the data signals may be transmitted to the corresponding data line DL through the conducting switch elements.

Referring to FIGS. 1, 2, 5, 6, and 7, in the embodiment of the present disclosure, the gating control lines K are positioned on the side of the switch element group 31 away from the pixel driving circuit array 10. That is, the switch element group 31 is closer to the pixel driving circuit array 10 than the gating control lines K. In this configuration, the data line DL does not need to pass through the gating control lines K when electrically connecting to the switch elements T in the switch element group 31. As a result, the gating control lines K do not interfere with the connection between the data line DL and the switch elements T, enabling the electrical connection without requiring re-routing of the data line DL and reducing the risk of disconnection or short circuits caused by re-routing.

Referring again to FIGS. 1, 2, 5, 6, and 7, the gating control lines K in the gating circuit 30 extend entirely along the first direction D1, occupying almost the entire width of the display panel along the first direction D1. In the shift register circuit 20, the width occupied by a single shift register along the first direction D1 is relatively small. In the related art (e.g., FIG. 3), when the gating circuit 30' is positioned on the side of each shift register facing the edge B' of the display panel, the space between the pixel driving circuit array 10' and the gating circuit 30' contains areas (e.g., the space on both sides of the second shift register 22' along the first direction D1) that cannot be effectively utilized, leading to wasted space. However, in the present disclosure, by positioning the gating circuit 30 between the second shift register 22 and the pixel driving circuit array 10, the space on both sides of the second shift register 22 along the first direction D1 on the side of the gating circuit 30 facing the edge B of the display panel may be effectively utilized. For example, some traces originally placed below the second shift register 22 may be moved up, and routing may be performed in the space on both sides of the second shift register 22. This arrangement reduces the overall space occupied by the second shift register 22 and the aforementioned traces along the second direction D2, allowing structures such as electrostatic protection circuits originally positioned below the second shift register 22 to be shifted closer to the pixel driving circuit array 10. As a result, transistors (e.g., those in the electrostatic protection circuits) in the display panel are moved farther from the edge B of the display panel. Considering that the display panel is formed by cutting a mother board, the edge B of the display panel may be regarded as the cutting edge. Placing transistors in the display panel away from the edge B reduces the impact of laser cutting during the manufacturing process and minimizes the risk of damage to the transistors caused by the laser.

Figure 8:
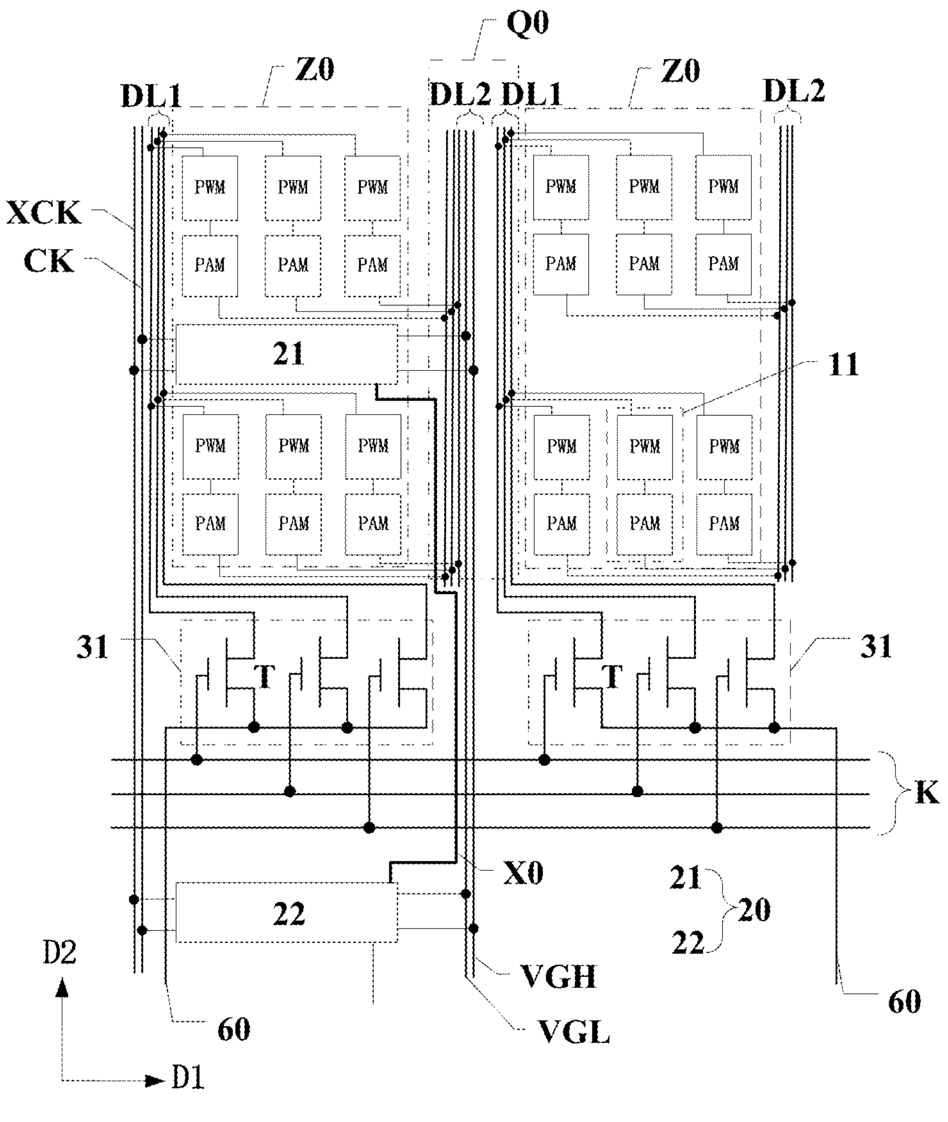
FIG. 8 illustrates a diagram of the relative positional relationship among a pixel driving circuit, a gating circuit, and a shift register circuit.
Figure 9:
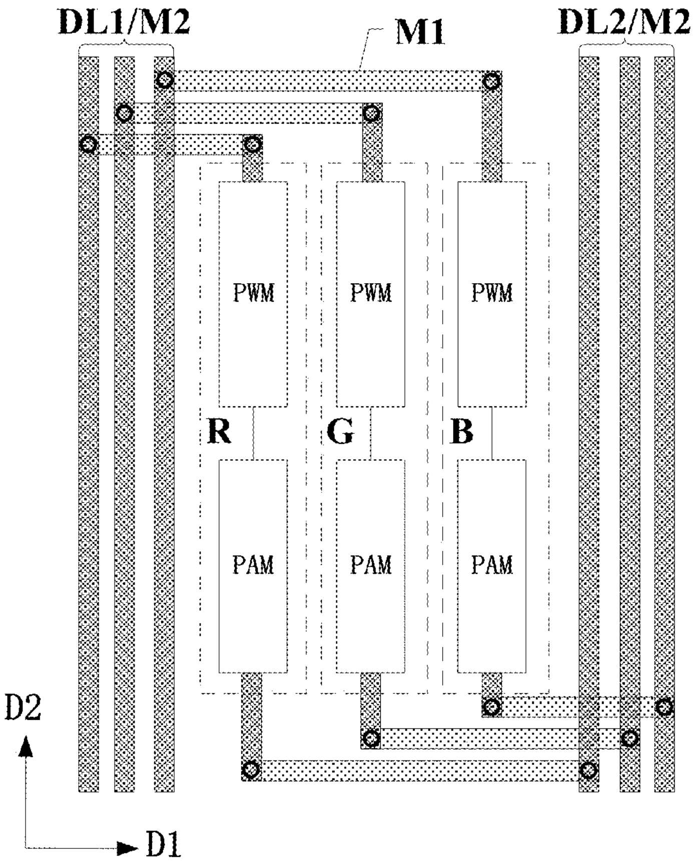
FIG. 9 illustrates a schematic diagram of a connection between a pixel driving circuit and a data line.
Figure 10:
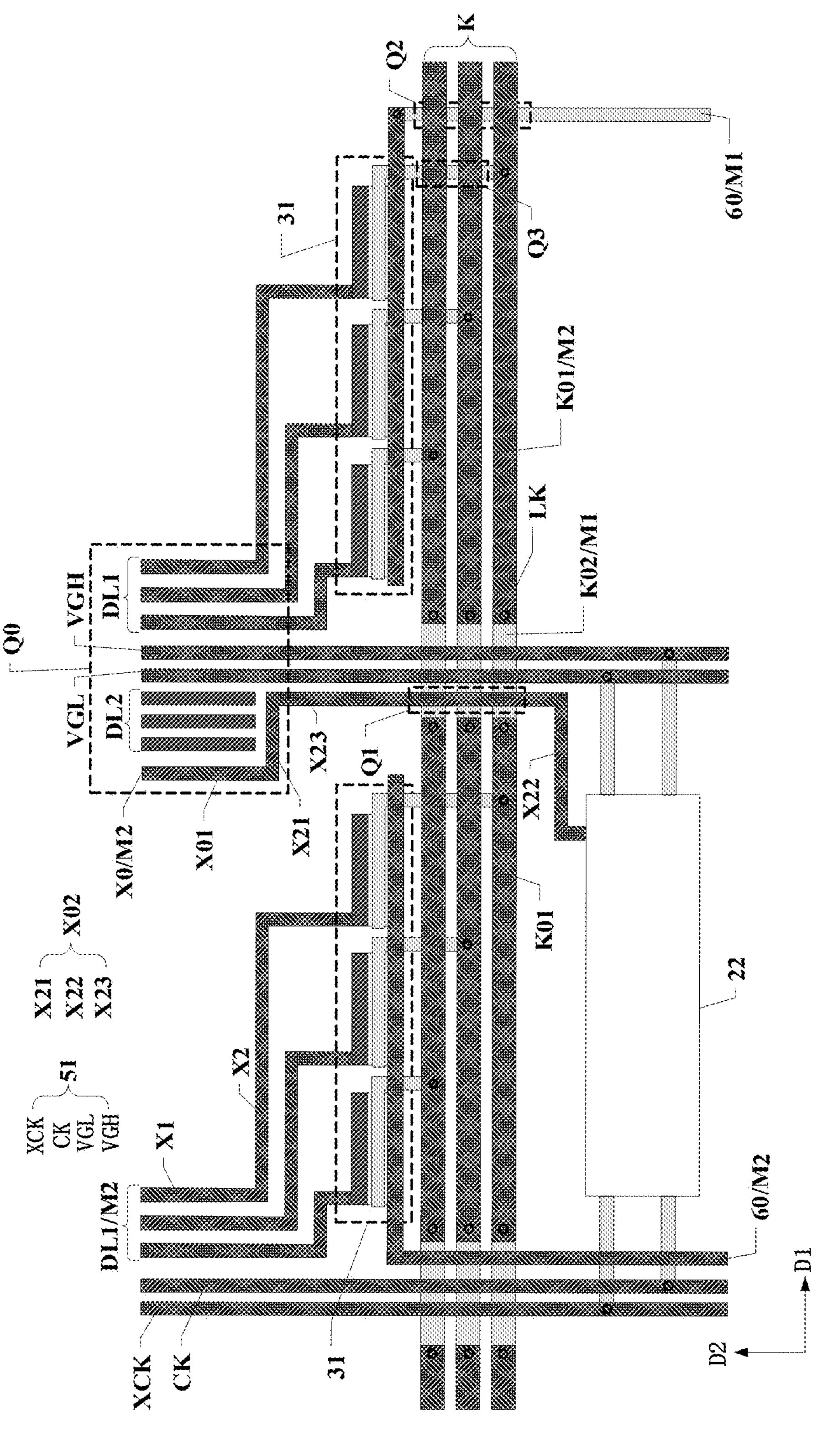
FIG. 10 illustrates a schematic diagram of the relative positional relationship between a signal transmission line and a gating control line.

FIG. 8 illustrates a diagram showing the relative positional relationship among the pixel driving circuit 11, the gating circuit 30, and the shift register circuit 20. FIG. 9 illustrates a schematic diagram of the connection between the pixel driving circuit and the data line, and FIG. 10 illustrates a schematic diagram of the relative positional relationship between the level transmission signal line X0 and the gating control line K. Referring to FIGS. 8 and 10, in one optional embodiment of the present disclosure, the second shift register 22 is electrically connected to the first shift register 21 through the level transmission signal line X0. In the direction perpendicular to the plane where the display panel is located, the level transmission signal line X0 overlaps with the gating control line K to form a first overlapping region Q1. In the first overlapping region Q1, the level transmission signal line X0 and the gating control line K are disposed in different layers.

Referring to FIGS. 5, 8, 9, and 10, when the second shift register 22 is positioned on the side of the gating circuit 30 facing the edge B of the display panel, the gating circuit 30 is introduced between the first shift register 21 and the second shift register 22. Since the gating control line K extends entirely along the first direction D1 and the level transmission signal line X0 connecting the first shift register 21 and the second shift register 22 extends entirely along the second direction D2, the level transmission signal line X0 overlaps with the gating control line K to form the first overlapping region Q1. In this embodiment, the level transmission signal line X0 and the gating control line K in the first overlapping region Q1 are disposed in different layers, thus reducing signal interference between the two. Optionally, in the first overlapping region Q1, the gating control line K is positioned in the first metal layer M1, while the level transmission signal line X0 is positioned in the second metal layer M2. The specific configuration of the gating control line K and the layer structure of the display panel will be detailed in subsequent embodiments.

In some embodiments of the present disclosure, when the gating circuit 30 is positioned between the first shift register 21 and the second shift register 22, the level transmission signal line X0 extending from the first shift register 21 passes through the gating control line K in the gating circuit 30 to electrically connect with the second shift register 22. In this case, either the gating control line K or the level transmission signal line X0 needs to be re-routed. The embodiment shown in FIG. 10 provides a method for re-routing the gating control line K. Referring to FIG. 10, optionally, the gating control line K includes a body portion K01 and a crossover portion K02 connected to the body portion K01. The body portion K01 and the crossover portion K02 are disposed in different layers and both extend along the first direction D1. At least part of the crossover portion K02 is located in the first overlapping region Q1, and the level transmission signal line X0 is in the same layer as the body portion K01. For the gating control line K, the body portion K01 occupies a significant part of the overall gating control line K, while the crossover portion K02 is a bridging structure designed to facilitate other signal lines passing through the gating control line K. The proportion of the crossover portion K02 in the entire gating control line K is smaller than that of the body portion K01. Optionally, the body portion K01 is positioned in the second metal layer M2, and the crossover portion K02 is positioned in the first metal layer M1.

In this embodiment, the body portion K01 and the crossover portion K02 connected to the body portion K01 are introduced into the gating control line K, where the crossover portion K02 and the body portion K01 are positioned in different layers and electrically connected through a via LK. When the level transmission signal line X0 passes through the gate control line K, the level transmission signal line X0 overlaps with the crossover portion K02 in the first overlapping area Q1. At this point, the level transmission signal line X0 may be positioned in the same layer as the body portion K01 of the gating control line K, avoiding interference with the gating control line K, making effective use of the layer structure in the display panel, and eliminating the need for re-routing the level transmission signal line X0.

Optionally, the line width of the gating control line K is greater than that of the first portion X1 of the data line DL. When the second shift register 22 is positioned between the gating circuit 30 and the pixel driving circuit array 10, for the data line DL to electrically connect to the gating circuit 30, the data line DL must pass through the second shift register 22. Since the data line DL involves a plurality of lines and occupies a limited space, its line width is relatively small. Re-routing the data line DL to reduce signal interference could increase the risk of short circuits or disconnections. However, when the gating circuit 30 is positioned between the second shift register 22 and the pixel driving circuit array 10, the data line DL may connect to the gating circuit 30 without requiring crossover lines. The level transmission signal line X0 may connect the first shift register 21 and the second shift register 22 by passing through the gating control line K. Therefore, in the embodiment of the present disclosure, the line width of the gating control line K is set to be larger than that of the data line DL. The body portion K01 and the crossover portion K02 of the gating control line K is connected in a bridging manner, reducing the risks associated with re-routing.

Figure 11:
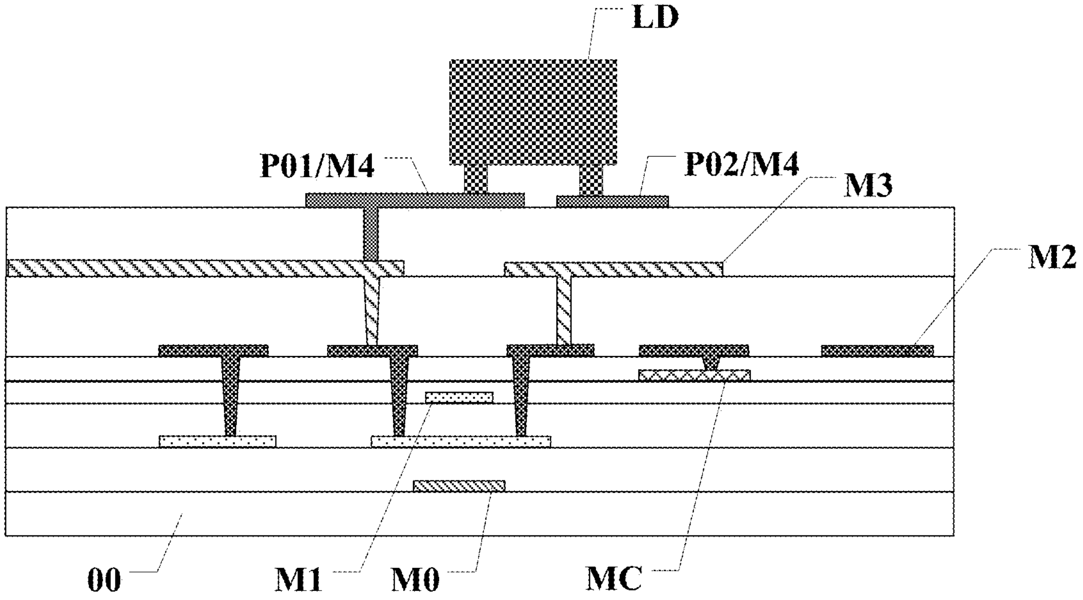
FIG. 11 illustrates a schematic diagram of a film layer of a display panel in accordance with some embodiments of the present disclosure.

FIG. 11 illustrates a schematic diagram of the film layer of a display panel in accordance with some embodiments of the present disclosure. In some embodiments of the present disclosure, the display panel includes a substrate 00, a first metal layer M1, and a second metal layer M2, where the first metal layer M1 and the second metal layer M2 are disposed on the substrate 00. The resistivity of the second metal layer M2 is lower than that of the first metal layer M1. In conjunction with FIG. 10, the body portion K01 of the gating control line K and the level transmission signal line X0 are located in the second metal layer M2, while the crossover portion K02 of the gating control line K is located in the first metal layer M1.

The display panel typically includes a plurality of transistors, such as transistors in the pixel driving circuit 11, transistors corresponding to the switch elements in the gating circuit 30, and transistors in the shift register circuit 20. In the layer structure of the display panel, optionally, the gate of a transistor is positioned in the first metal layer M1, while the source and drain are positioned in the second metal layer M2. Optionally, the material of the first metal layer M1 is primarily Mo, and the material of the second metal layer M2 is Ti—Al—Ti. Due to the inherent properties of these materials, the impedance of the first metal layer M1 is greater than that of the second metal layer M2. That is, the resistivity of the first metal layer M1 is higher than that of the second metal layer M2, and the second metal layer M2 has better conductivity than the first metal layer M1. When the body portion K01 of the gating control line K is positioned in the second metal layer M2, it reduces the overall impedance of the gating control line K, thereby decreasing the voltage drop of the control signals transmitted along the gating control line K. This improves the accuracy of the signals transmitted by the gating control line K. Additionally, when the level transmission signal line X0 is positioned in the second metal layer M2, it similarly reduces the impedance and voltage drop of the level transmission signal, enhancing the accuracy of the level transmission signals transmitted by the level transmission signal line X0.

Optionally, in some embodiments of the present disclosure, the data line DL is also positioned in the second metal layer M2 to reduce its impedance, thereby decreasing the voltage drop of the data signals transmitted along the data line DL and improving the accuracy of the transmitted data signals.

Optionally, the display panel in accordance with some embodiments of the present disclosure further includes a semiconductor layer poly positioned on the side of the first metal layer M1 facing the substrate 00, and an auxiliary metal layer M0 positioned on the side of the semiconductor layer poly facing the substrate. It should be noted that the display panel may include transistors with a double-gate structure, where one gate may be positioned in the first metal layer M1, and the other gate may be positioned in the auxiliary metal layer M0. In the direction perpendicular to the plane of the substrate 00, both the first metal layer M1 and the auxiliary metal layer M0 overlap with the semiconductor layer poly. The auxiliary metal layer M0 also serves a light-shielding function to prevent light from affecting the semiconductor layer poly. Optionally, a capacitor metal layer MC may be further included between the first metal layer M1 and the second metal layer M2, and the capacitor metal layer MC may form a capacitor structure with the second metal layer M2. Optionally, on the side of the second metal layer M2 away from the substrate, a third metal layer M3 and a fourth metal layer M4 may be included, and both the third metal layer M3 and the fourth metal layer M4 may be used for signal line routing.

Referring to FIGS. 5, 8, and 10, in some embodiments of the present disclosure, along the first direction D1, the crossover portion K02 is positioned between adjacent switch element groups 31; along the second direction D2, the second shift register 22 and the switch element group 31 overlap; and along the first direction D1, the level transmission signal line X0 connected to the second shift register 22 is positioned on the same side as the second shift register 22 and its corresponding switch element group 31. For example, in some embodiments of the present disclosure, the level transmission signal line X0 is positioned to the right side of the switch element group 31 and the corresponding second shift register 22. Specifically, when the crossover portion K02 is introduced into the gating control line K, the crossover portion K02 may be positioned in the area between adjacent switch element groups 31. The level transmission signal line X0 is routed on the same side as the second shift register 22 and the switch element group 31 adjacent to the second shift register 22. The level transmission signal line X0 extending from the first shift register 21 passes through the crossover portion K02 of the gating control line K and then connects to the second shift register 22. This configuration not only avoids interference between the level transmission signal line X0 and the gating control line K, but also facilitates the simplification of the routing structure of the level transmission signal line X0.

Referring to FIGS. 8 and 10, and in combination with FIG. 5, in some embodiments of the present disclosure, the level transmission signal line X0 includes a main portion X01 and a bypass portion X02 electrically connected to the main portion. The main portion X01 is located in the region where the pixel driving circuit array 10 is located, and extends along the second direction D2. The bypass portion X02 is located on the side of the pixel driving circuit array 10 facing the edge B of the display panel, and is electrically connected to the second shift register 22. The main portion X01 extends along the second direction D2, while the bypass portion X02 includes a first bypass line X21, a connection portion X23, and a second bypass line X22. The first bypass line X21, the connection portion X23, and the second bypass line X22 are electrically connected in sequence. The first bypass line X21 and the second bypass line X22 extend along the first direction D1, and the connection portion X23 extends along the second direction D2. The first bypass line X21 is connected to the main portion X01, and the second bypass line X22 is connected to the second shift register 22.

It should be noted that this embodiment illustrates a configuration where the crossover portion K02 of the gating control line K and the main portion X01 of the level transmission signal line X0 are disposed in an offset manner along the second direction D2. That is, the crossover portion K02 of the gating control line K is not located directly beneath the extension direction of the main portion X01 of the level transmission signal line X0. As a result, the bypass portion X02 is introduced into the level transmission signal line X0 to achieve the electrical connection between the main portion X01 and the second shift register 22 through the bypass portion X02. For example, when the crossover portion K02 of the gating control line K is located in the lower right region of the main portion X01 of the level transmission signal line X0, the main portion X01 first connects to the first bypass line X21 of the bypass portion X02, where the first bypass line X21 extends along the first direction D1. The first bypass line X21 extends to the right side of the main portion X01 and connects to the connection portion X23, where the connection portion X23 extends along the second direction D2. The connection portion X23 extends downward from the first bypass line X21, passes through the crossover portion K02 of the gating control line K, and continues downward to connect with the second bypass line X22. The second bypass line X22 extends along the second direction D2 to the region of the second shift register 22, completing the connection to the second shift register 22. By introducing the bypass portion X02, the need for re-routing the level transmission signal line X0 is avoided, simplifying the layer configuration of the display panel. Additionally, when the level transmission signal line X0 is entirely positioned in the second metal layer M2, it helps reduce the impedance of the level transmission signal line X0 and improves the transmission efficiency of the level transmission signals. It should be noted that when the crossover portion K02 is located directly beneath the main portion X01 of the level transmission signal line X0, the bypass portion is not required.

Referring again to FIGS. 8 and 10, in some embodiments of the present disclosure, the pixel driving circuit array 10 includes a plurality of pixel circuit column groups Z0 disposed along the first direction D1. A pixel circuit column group includes at least two pixel circuit columns. In this embodiment, a single pixel circuit column group is described as including three pixel circuit columns as an example, but this is not limiting. There is a spacing region Q0 between adjacent pixel circuit column groups Z0. Along the second direction D2, the crossover portion K02 overlaps with the spacing region Q0. This effectively positions the crossover portion K02 of the gating control line K directly beneath the spacing region Q0 along the second direction D2. Considering that signal lines extending along the second direction D2 are disposed between the pixel circuit column groups Z0, some of these signal lines (types of these signal lines will be specified in subsequent embodiments) need to extend to the side of the pixel driving circuit array 10 facing the edge B of the display panel to connect with the bonding pad P1. Therefore, when the crossover portion K02 of the gating control line K is positioned directly beneath the spacing region Q0, the aforementioned signal lines can pass through the region of the crossover portion K02 for further extension. These signal lines may be disposed in the second metal layer M2, and when passing through the region of the crossover portion K02, they do not require re-routing or bypassing. Instead, the original routing layout may be maintained, simplifying the routing complexity introduced by the crossover portion K02 and simplifying the manufacturing process of the display panel.

Referring to FIGS. 4, 8, and 10, in some embodiments of the present disclosure, the display panel further includes a plurality of first signal lines 51 extending along the second direction D2. The first signal lines 51 are configured to provide signals to the shift register circuit 20. The first signal lines 51 are positioned on at least one side of the shift register circuit 20 along the first direction D1 and are located in the spacing region Q0. Perpendicular to the plane of the light-emitting surface of the display panel, the first signal lines 51 overlap with the crossover portion K02 but do not overlap with the body portion K01 of the gating control line K. The first signal lines 51 are disposed in the same layer as the body portion K01.

The first signal lines 51 mentioned in this embodiment are routing lines connected to the shift register circuit 20 and configured to provide signals to the shift register circuit 20, The first signal lines 51 may be a constant high-level signal line VGH, where the constant high-level signal line VGH provides high-level signals to the shift register circuit 20; the first signal lines 51 may be a constant low-level signal line VGL, where the constant low-level signal line VGL provides low-level signals to the shift register circuit 20; and the first signal lines 51 may be clock signal lines, where the clock signal lines includes a first clock signal line XCK and a second clock signal line CK, and provides clock signals to the shift register circuit 20. Optionally, these four types of signal lines may be distributed in pairs on either side of the shift register circuit 20 along the first direction D1. For example, the first clock signal line XCK and the second clock signal line CK may be positioned on the left side of the shift register circuit 20, while the constant high-level signal line VGH and the constant low-level signal line VGL may be positioned on the right side of the shift register circuit 20. This arrangement facilitates the connection of the shift register circuit 20 to these signal lines while ensuring a more uniform routing layout. When the first signal lines 51 extend to the side of the pixel driving circuit array 10 facing the edge B of the display panel, they overlap with the crossover portion K02 of the gating control line K but are disposed in a different layer from the crossover portion K02. For example, the first signal lines 51 may be disposed in the same layer as the body portion K01 of the gating control line K. In this way, the first signal lines 51 may follow their original routing layout without requiring re-routing operations. Therefore, even when the gating unit is positioned between the second shift register 22 and the pixel driving circuit array 10, the routing structure of the first signal lines 51 remains unaffected. Optionally, both the first signal lines 51 and the body portion K01 of the gating control line K are located in the second metal layer M2 of the display panel. The low resistivity of the second metal layer M2 reduces voltage drops during signal transmission, improving signal transmission efficiency.

Referring to FIGS. 8 and 10, in some embodiments of the present disclosure, the level transmission signal line X0 is positioned in the spacing region Q0 and is located on the side of the first signal lines 51 facing the shift register circuit 20. In addition to the first signal lines 51 mentioned in the preceding embodiments, the signal lines connected to the shift register circuit 20 also include the level transmission signal line X0, where the level transmission signal line X0 is used to connect adjacent stages of shift registers. For example, for the first shift register 21, the output terminal of the first shift register 21 not only connects to the pixel driving line GL but also connects to the input terminal of the next-stage shift register through the level transmission signal line X0. The first signal lines 51 are shared signal lines used by a plurality of shift registers in the shift register circuit 20. For example, the constant high-level signal required by multiple shift registers in the shift register circuit 20 may be provided by a single constant high-level signal line VGH. In contrast, the level transmission signal line X0 transmits the output signal of one stage of the shift register to the next stage of the shift register. When both the level transmission signal line X0 and the first signal lines 51 are positioned in the spacing region Q0, the level transmission signal line X0 is disposed on the side of the first signal lines 51 facing the shift register circuit 20. In other words, the level transmission signal line X0 is positioned closer to the shift register circuit 20 than the first signal lines 51, making it more convenient for the level transmission signal line X0 to connect adjacent stages of shift registers. Optionally, the level transmission signal line X0 is positioned in the second metal layer M2.

Referring again to FIGS. 8 and 10, in some embodiments of the present disclosure, the data line DL includes a first type of data line DL1 and a second type of data line DL2, corresponding to the pixel circuit column groups Z0. Both the first type of data line DL1 and the second type of data line DL2 are electrically connected to the pixel driving circuit 11. Additionally, the first type of data line DL1 is electrically connected to the gating circuit 30. Along the first direction D1, the first type of data line DL1 and the second type of data line DL2 are positioned on opposite sides of the corresponding pixel circuit column group Z0. The level transmission signal line X0 and the second type of data line DL2 corresponding to the pixel driving circuit column group Z0 which is in the same column as the shift register circuit 20, are positioned in the same spacing region Q0.

In conjunction with FIGS. 5, 9, and 10, in some embodiments of the present disclosure, the display panel may be a Micro LED display panel, where the light-emitting elements are Micro LEDs. The pixel driving circuit 11 is used to connect to and drive the light-emitting elements. The pixel driving circuit 11 includes a pulse width modulation circuit (PWM) and a pulse amplitude modulation circuit (PAM) (the specific structures of the PWM and PAM circuits may refer to existing structures, and the present disclosure does not specifically limit them). The PWM circuit is electrically connected to the PAM circuit, and the output terminal of the PAM circuit is electrically connected to the light-emitting elements to provide a driving current to the light-emitting elements. The PAM circuit is configured to control the amplitude of the driving current, and the PWM circuit is configured to control the pulse width of the driving current, where the pulse width of the driving current refers to the duration of the driving current, and the amplitude of the driving current refers to the current value of the driving current. In this embodiment, the first type of data line DL1 is a signal line configured to transmit data signals to the PWM circuit, and the second type of data line DL2 is a signal line configured to transmit data signals to the PAM circuit. To achieve a uniform arrangement of signal lines, the first type of data line DL1 and the second type of data line DL2 are disposed on opposite sides of the pixel driving circuit 11 along the first direction D1. Optionally, the second type of data line DL2 is a global signal line; for example, the second type of data line DL2 providing data signals to light-emitting elements of the same color is electrically connected. Thus, there is no need to introduce the gating circuit 30 for the second type of data line DL2. The first type of data line DL1 is connected to the gating circuit 30 on the side of the pixel driving circuit array 10 facing the edge B of the display panel. During the connection, the first portion X1 of the first type of data line DL1 is routed through the second portion X2 to the top of the gating circuit 30, where it is electrically connected to the gating circuit 30. The level transmission signal line X0 is electrically connected to the second shift register 22 through the bypass portion X02. When the level transmission signal line X0 and the first type of data line DL1 are disposed in the same spacing region, the second portion X2 of the first type of data line DL1 may interfere with the bypass portion X02 of the level transmission signal line X0, requiring re-routing to achieve electrical connection with the second shift register 22. In this embodiment, when the level transmission signal line X0 and the second type of data line DL2 are disposed in the same spacing region Q0 on one side of the pixel driving circuit 11, the second portion X2 of the first type of data line DL1 and the bypass portion X02 of the level transmission signal line X0 do not interfere with each other, thus simplifying the routing of both the first type of data line DL1 and the level transmission signal line X0.

Referring to FIGS. 8 and 10, in some embodiments of the present disclosure, taking the pixel driving circuit column group Z0 on the left side in FIGS. 8 and 10 as an example, the shift register circuit and the pixel driving circuit column group Z0 are located in the same column. When the level transmission signal line X0 and the second type of data line DL2 are disposed in the same spacing region Q0, the second type of data line DL2 is located between the level transmission signal line X0 and the first signal line 51.

This embodiment specifies the relative positional relationship among the level transmission signal line X0, the first signal line 51, and the second type of data line DL2 when they are disposed in the same spacing region Q0. It should be noted that the spacing region Q0 mentioned in this embodiment is located on both sides of the same shift register circuit 20 and adjacent to the shift register circuit 20, as well as on both sides of the same pixel circuit column group Z0 and adjacent to the pixel circuit column group Z0. The level transmission signal line X0 and the first signal line 51 are both connected to the shift register circuit 20, while the second type of data line DL2 is electrically connected to the pixel driving circuit 11. In this embodiment, the level transmission signal line X0 is closest to the shift register circuit 20, the second type of data line DL2 is positioned between the level transmission signal line X0 and the first signal line 51, and the first signal line 51 is farthest from the shift register circuit 20. This arrangement facilitates the routing of the level transmission signal line X0 connecting the first shift register 21 and the second shift register 22, avoiding the need for additional bypasses. Additionally, when the bypass portion X02 of the level transmission signal line X0 and the first signal line 51 both extend to the crossover portion K02 of the gating control line K, there is no interference between the level transmission signal line X0 and the first signal line 51, reducing routing complexity.

In some embodiments of the present disclosure, referring to FIGS. 8 and 10, in the same switch element group 31, the input terminals of different switch elements T are connected to the same input line 60. Perpendicular to the light-emitting surface of the display panel, at least part of the input lines 60 corresponding to the switch element group 31 overlap with the crossover portion K02 of the gating control line K, and the input lines 60 are disposed in the same layer as the body portion K01 of the gating control line K.

To facilitate the connection of the data line DL with the switch elements in the switch element group 31 and to avoid re-routing the data line DL, in the gating circuit 30 provided by the present disclosure, the switch elements are located between the pixel driving circuit array 10 and the gating control line K. The input terminals of the switch elements in the same switch element group 31 are electrically connected to the same input line 60. The input line 60 is configured to electrically connect with the bonding pad P1 in the display panel. The bonding pad P1 is typically positioned on the side of the gating circuit 30 away from the pixel driving circuit array 10. Consequently, when the input line 60 is electrically connected to the bonding pad P1, the input line 60 passes through the gating control line K. In this embodiment, referring to FIGS. 8 and 10, the input line 60 corresponding to the switch element group 31 located on the left side, the input line 60 is disposed in the same layer as the body portion K01 of the gating control line K and passes through the gating control line K at the position of the crossover portion K02. In this case, the input line 60 does not require re-routing, thus simplifying the routing process of the input line 60. Additionally, the input line 60 may be disposed in the second metal layer M2 of the display panel to reduce impedance and signal transmission voltage drop of the input line 60, thereby improving the signal transmission speed along the input line 60.

When the first shift register 21 is introduced in the region of the pixel circuit array, the spacing region Q0 adjacent to the first shift register 21 may include the first signal line 51 and the level transmission signal line X0. The first signal line 51 and the level transmission signal line X0 are connected to the shift register circuit 20. To avoid interference from the gating control line K of the gating circuit 30 with these signal lines, the crossover portion K02 is introduced into the gating control line K, allowing the signal lines to pass through the gating control line K at the position of the crossover portion K02. For the input line 60 connected to the switch elements in the gating circuit 30, when the gating control line K in the corresponding region includes a crossover portion K02, the input line 60 can pass through the gating control line K at the position of the crossover portion K02. Considering that the gating circuit 30 is disposed on the side of each pixel circuit column group Z0 facing the edge B of the display panel, while shift register circuits 20 are only positioned at specific locations corresponding to some pixel circuit column groups Z0, not every spacing between adjacent switch element groups 31 includes a crossover portion K02 of the corresponding gating control line K. For example, in the embodiments shown in FIGS. 8 and 10, the shift register circuit is not provided at the position corresponding to the pixel driving circuit column group Z0 on the right side. In the switch element group 31 corresponding to this pixel driving circuit column Z0, when the gating control line K in the area corresponding to the input line 60 does not include a crossover portion, the input line 60 may also be re-routed when passing through the position of the crossover portion K02. For example, referring to the input line 60 corresponding to the switch element group 31 on the right side in FIG. 10, in the same switch element group 31, the input terminals of different switch elements are connected to the same input line 60. Perpendicular to the light-emitting surface of the display panel, at least part of the input lines 60 corresponding to the switch element group 31 overlap with the body portion K01 of the gating control line K to form a second overlapping region Q2. In the second overlapping region Q2, the input line 60 is disposed in the same layer as the crossover portion K02 of the gating control line K.

In this embodiment, when the input line 60 passes through the gating control line K and the crossover portion K02 is not set at the corresponding position of the gating control line K, the input line 60 may overlap with the body portion K01 of the gating control line K. In the second overlapping region Q2 formed by their overlap, the input line 60 and the body portion K01 of the gating control line K are disposed in different layers. Additionally, the input line 60 may be disposed in the same layer as the crossover portion K02 in other regions of the gating control line K. This configuration makes reasonable use of the existing layers in the display panel to avoid interference between the input line 60 and the gating control line K.

Figure 12:
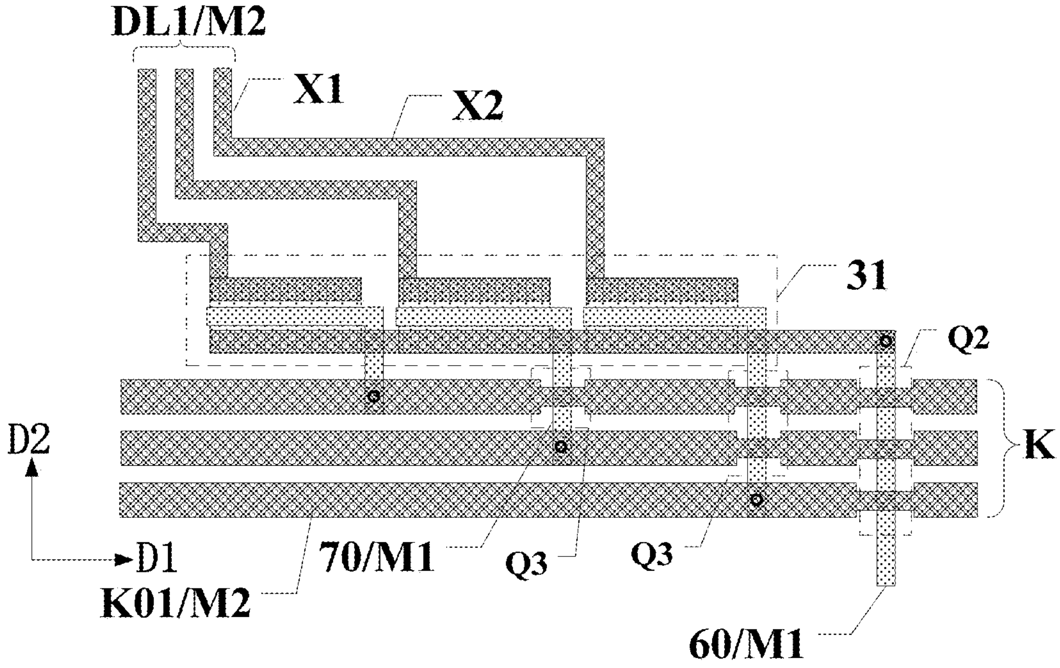
FIG. 12 illustrates a diagram of a relative positional relationship between a switch element group in a gating circuit and a gating control line, as in accordance with some embodiments of the present disclosure.
Figure 13:
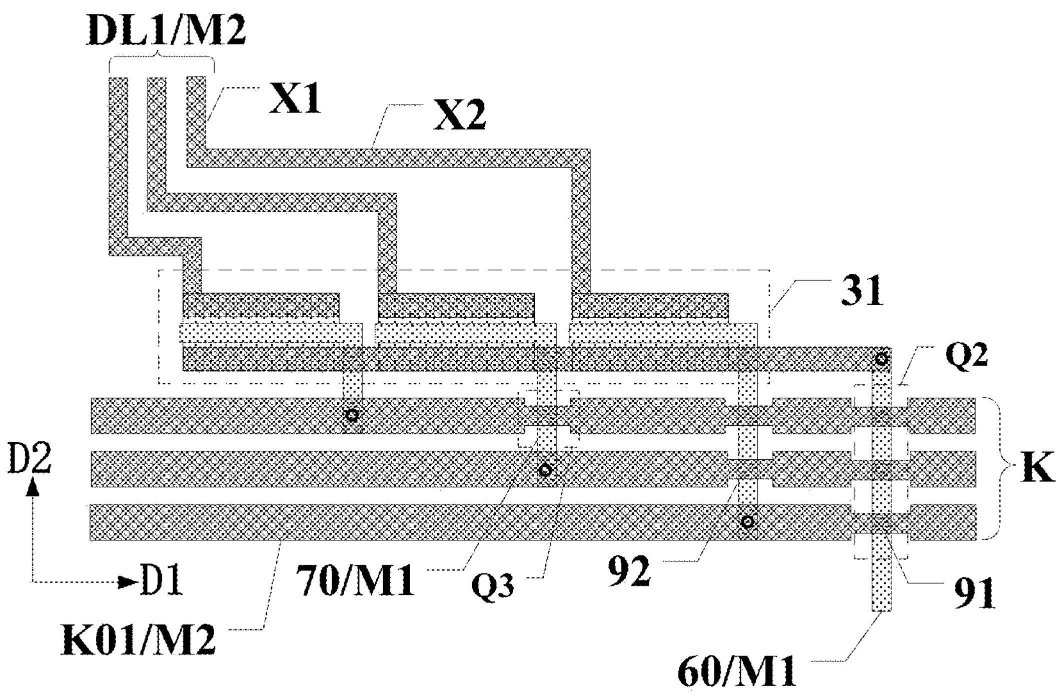
FIG. 13 illustrates a diagram of another relative positional relationship between a switch element group in a gating circuit and a gating control line, as in accordance with some embodiments of the present disclosure.

FIGS. 12 and 13 respectively illustrate another relative positional relationship between a switch element group 31 and a gating control line K in a gating circuit 30 provided by the present disclosure. Referring to FIGS. 8, 12, and 13, in some embodiments of the present disclosure, the line width of the body portion K01 in the second overlapping region Q2 is less than or equal to its line width in other regions. And/or, the body portion K01 further includes a first opening 91. In the direction perpendicular to the plane of the display panel, the first opening 91 is at least located in the second overlapping region Q2.

Referring to FIG. 12, when the input line 60 overlaps with the body portion K01 of the gating control line K using a re-routing approach, some embodiments of the present disclosure provide a configuration of narrowing the width of the segment of the body portion K01 located in the second overlapping region Q2. This reduces the overlapping area between the input line 60 and the gating control line K in the second overlapping region Q2, thereby reducing their coupling capacitance and minimizing or avoiding the interference of coupling capacitance with the signals on the input line 60 and the gating control line K. Alternatively, as shown in some embodiments of the present disclosure in FIG. 13, a first opening 91 may be formed on the segment of the body portion K01 located in the second overlapping region Q2, such that the first opening 91 overlaps with the input line 60. This also reduces the actual overlapping area between the input line 60 and the gating control line K, thereby reducing their coupling capacitance. To further reduce the coupling capacitance between the input line 60 and the gating control line K, the line width of the body portion K01 in the second overlapping region Q2 may be narrowed, and the first opening 91 may be formed on the narrowed body portion K01, as illustrated in FIG. 13.

Referring again to FIGS. 12 and 13, in some embodiments of the present disclosure, the gate of the switch element is electrically connected to the gating control line K through a gate connection line 70. The gate connection line 70 extends along the second direction D2. In the direction perpendicular to the light-emitting surface of the display panel, at least one gate connection line 70 overlaps with the body portion K01, forming a third overlapping region Q3. In the third overlapping region Q3, the line width of the body portion K01 is less than or equal to its line width in other regions. And/or, the body portion K01 further includes a second opening 92. In the direction perpendicular to the plane of the display panel, the second opening 92 is at least located in the third overlapping region Q3.

In conjunction with FIGS. 1, 2, 12, and 13, to facilitate the connection of the switch elements in the gating circuit 30 with the data line DL and to avoid the risk of short circuits or disconnections caused by re-routing the data line DL, in some embodiments of the present disclosure, the switch element group 31 in the gating circuit 30 is disposed on the side of the gating control line K facing the pixel driving circuit array 10. Considering that the gate of the switch element in the switch element group 31 is connected to the gating control line K, taking FIG. 12 as an example, the three switch elements in the same switch element group 31 are respectively electrically connected to three gating control lines K in a one-to-one correspondence. The three gating control lines K are arranged along the second direction D2. When connecting a switch element to a non-adjacent gating control line K, the gate connection line 70 passes through one or two other gating control lines K, overlapping with them to form a third overlapping region Q3. The gate connection line 70 and the gate of the switch element may be disposed in the same layer, while the gate connection line 70 and the body portion K01 of the gating control line K are disposed in different layers. In this way, the gate connection line 70 can achieve electrical connection with the corresponding gating control line K without requiring re-routing, simplifying the routing complexity of the gate connection line 70.

Considering that coupling capacitance may be generated between the gate connection line 70 and the gating control line K when the gate connection line 70 and the gating control line K overlap, leading to signal interference, in the third overlapping region Q3, the line width of the body portion K01 of the gating control line K may be reduced. For example, referring to FIGS. 12 and 13, this reduces the actual overlapping area between the gate connection line 70 and the gating control line K, thereby reducing the coupling capacitance between the two. Alternatively, as shown in FIG. 13, the second opening 92 may be formed on the body portion K01 in the third overlapping region Q3, allowing the second opening 92 to overlap with the gate connection line 70. This also reduces the actual overlapping area between the gate connection line 70 and the gating control line K, thus reducing the coupling capacitance between the two. Additionally, in the third overlapping region Q3, the line width of the body portion K01 may be reduced while simultaneously forming the second opening 92 on the narrowed body portion K01, thus further reducing the actual overlapping area between the gate connection line 70 and the gating control line K and minimizing or avoiding signal interference between the gate connection line 70 and the gating control line K.

Optionally, the gate connection line 70 may be routed on the left side of the corresponding transistor along the first direction D1 to achieve electrical connection with the gating control line K, or the gate connection line 70 may be routed on the right side of the corresponding transistor along the first direction D1 to achieve such connection. The present disclosure does not specifically limit this configuration.

Figure 14:
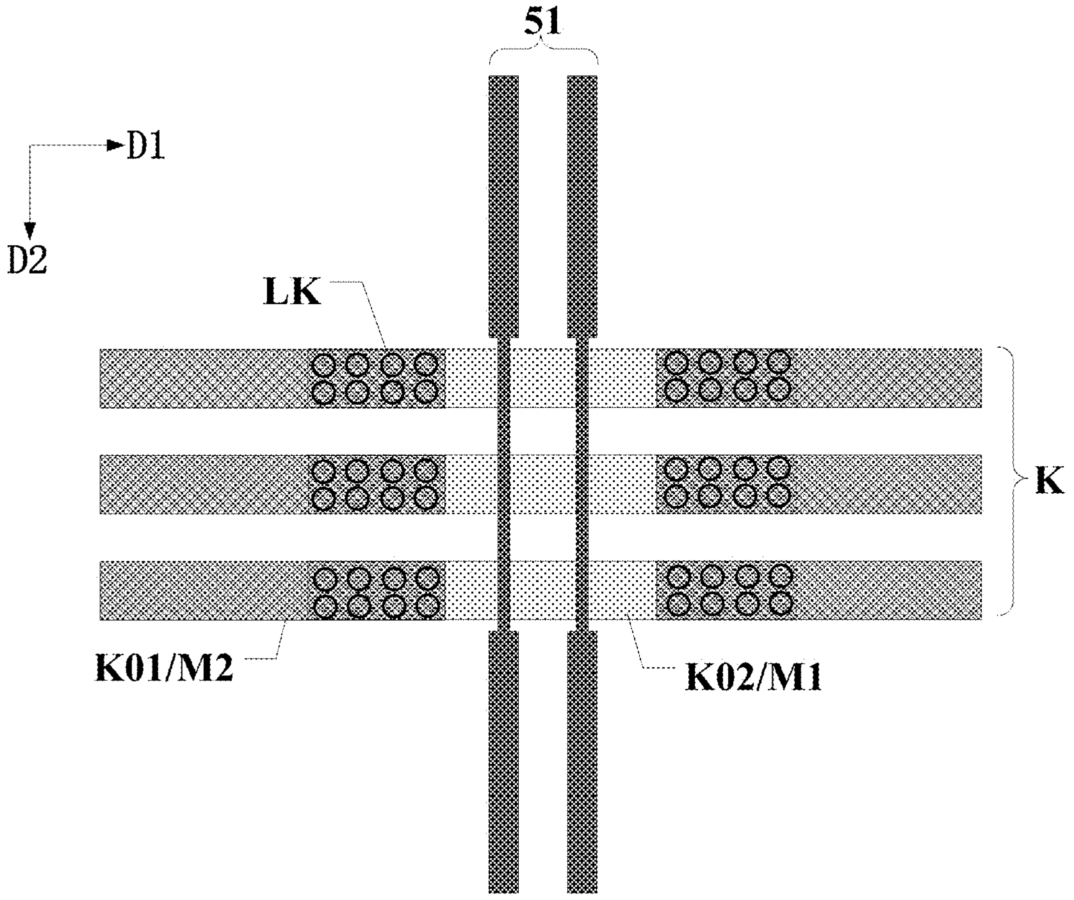
FIG. 14 illustrates a schematic layout diagram of a gating control line and a first signal line overlapping therewith.

FIG. 14 illustrates a schematic layout diagram of the gating control line K and the first signal line 51 overlapping with the gating control line K. When the gating control line K extending along the first direction D1 overlaps with the first signal line 51 extending along the second direction D2, the first signal line 51 may be disposed in the same layer as the body portion K01 of the gating control line K and overlap with the crossover portion K02 of the gating control line K. To reduce signal interference between the gating control line K and the first signal line 51, the line width of the first signal line 51 in the overlapping region may be reduced, making the line width of the first signal line 51 in the overlapping region smaller than the line width in other regions. It should be noted that FIG. 14 takes the first signal line 51 overlapping with the gating control line K as an example. In some other embodiments of the present disclosure, when the signal line overlapping with the gating control line K is another type of signal line, a similar design as shown in FIG. 14 may be adopted to reduce the line width of the signal line extending along the second direction D2 in the overlapping region.

Additionally, when the body portion K01 and the crossover portion K02 are introduced into the gating control line K, electrical connection between the body portion K01 and the crossover portion K02 in different layers may be achieved through one or more connection holes LK. When multiple connection holes LK are used, for example, as shown in FIG. 14, the multiple connection holes LK are effectively connected in parallel, which helps reduce the overall impedance of the gating control line K.

Referring to FIGS. 1 and 2, and in combination with FIG. 8, in some embodiments of the present disclosure, the pixel driving circuit array 10 includes a plurality of pixel circuit column groups Z0 arranged along the first direction D1. A pixel circuit column group Z0 includes at least two pixel circuit columns, with a spacing region Q0 between adjacent pixel circuit column groups Z0. Along the second direction D2, the shift register circuit 20 and the gating circuit 30 overlap with the pixel circuit column groups Z0. The first direction D1 and the second direction D2 intersect, and the second direction D2 is the direction from the pixel driving circuit array 10 toward the second shift register 22.

In some embodiments of the present disclosure, the first shift register 21 in the shift register circuit 20 is disposed in the region of the pixel driving circuit array 10. Typically, the display region includes the region where the pixel driving circuit array 10 is located. Thus, at least most of the shift registers in the shift register circuit 20 are disposed in the display region, without occupying space in the border region of the display panel. This facilitates the realization of a narrow-bezel or bezel-free design for the display panel. When the shift register circuit 20 and the gating circuit 30 are introduced into the display panel, the shift register circuit 20 and the gating circuit 30 are disposed to overlap with the pixel circuit column groups Z0 along the second direction D2. Specifically, the shift registers in the shift register circuit 20 and the switch element group 31 in the gating circuit 30 overlap with the pixel circuit column groups Z0. This reduces the space occupied by the shift registers or the switch element group 31 in the spacing region Q0 between the pixel circuit column groups Z0, avoiding interference with the existing wiring structure in the spacing region Q0.

Referring to FIG. 8, in some embodiments of the present disclosure, along the second direction D2, neither the first shift register 21 nor the second shift register 22 overlaps with the spacing region Q0. Thus, the first shift register 21 does not occupy space in the spacing region Q0 between the pixel driving circuit column groups, and the second shift register 22 does not occupy space in the extending direction of the spacing region Q0. As a result, the existing wiring structure in the spacing region Q0 remains unaffected.

Figure 15:
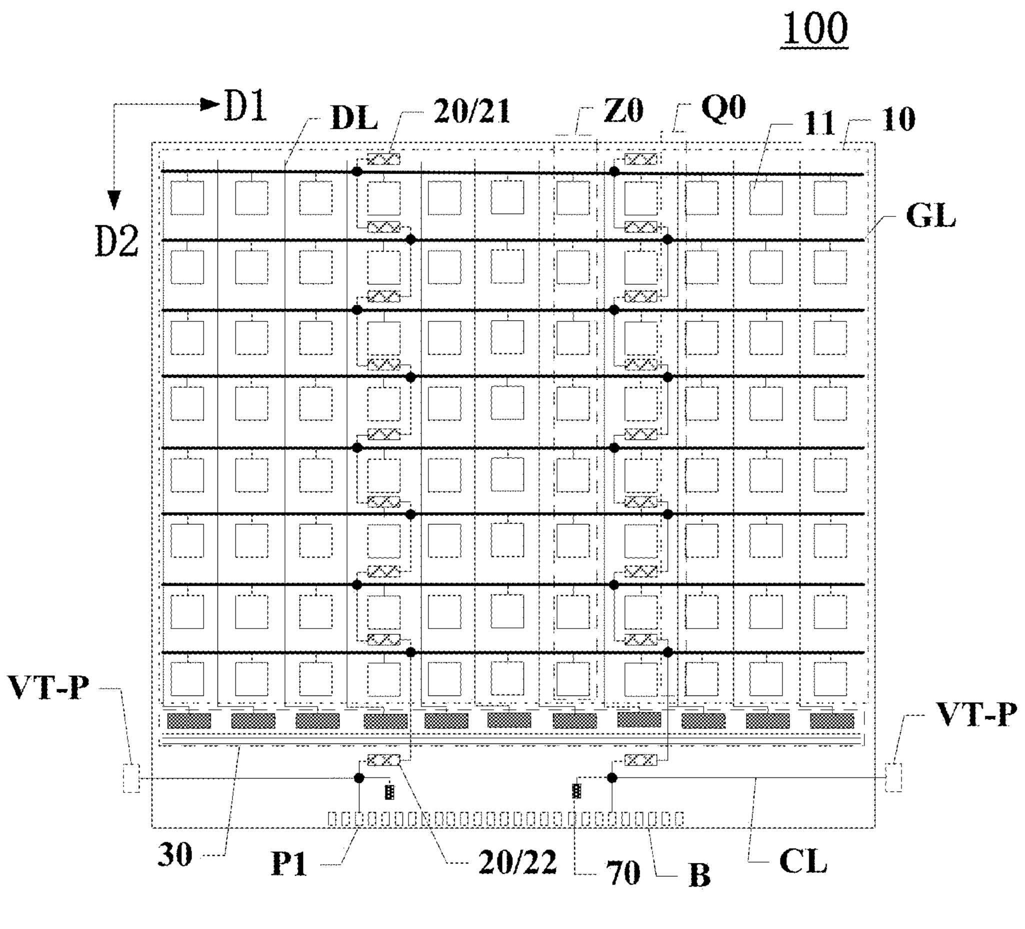
FIG. 15 illustrates another planar structural diagram of a display panel in accordance with some embodiments of the present disclosure.

FIG. 15 illustrates another planar structural diagram of the display panel in accordance with some embodiments of the present disclosure. Referring to FIG. 15, in some embodiments of the present disclosure, the display panel includes an electrostatic protection circuit 70. The electrostatic protection circuit 70 is located on the side of the pixel driving circuit array 10 facing the edge B of the display panel, with at least a portion of the electrostatic protection circuit 70 electrically connected to the second shift register 22. It should be noted that FIG. 15 only illustrates the electrostatic protection circuit 70 connected to the second shift register 22. In practice, additional electrostatic protection circuits 70 may be disposed on the side of the pixel driving circuit array 10 facing the edge B of the display panel, such as those electrically connected to other signal lines requiring electrostatic protection, as shown in FIG. 5. The present disclosure does not specifically limit this.

This embodiment demonstrates a solution where the electrostatic protection circuit 70 is introduced on the side of the pixel driving circuit array 10 facing the edge B of the display panel. The electrostatic protection circuit 70 is disposed on the side of the display panel close to its edge and is configured to connect with some signal lines located near the edge of the display panel, preventing electrostatic damage to the display panel. For example, part of the electrostatic protection circuit 70 may be electrically connected to the output terminal of the second shift register 22 to prevent electrostatic damage to the shift register circuit 20. It should be noted that the electrostatic protection circuit 70 may adopt structures from related technologies, and the present disclosure does not specifically limit this.

Figure 16:
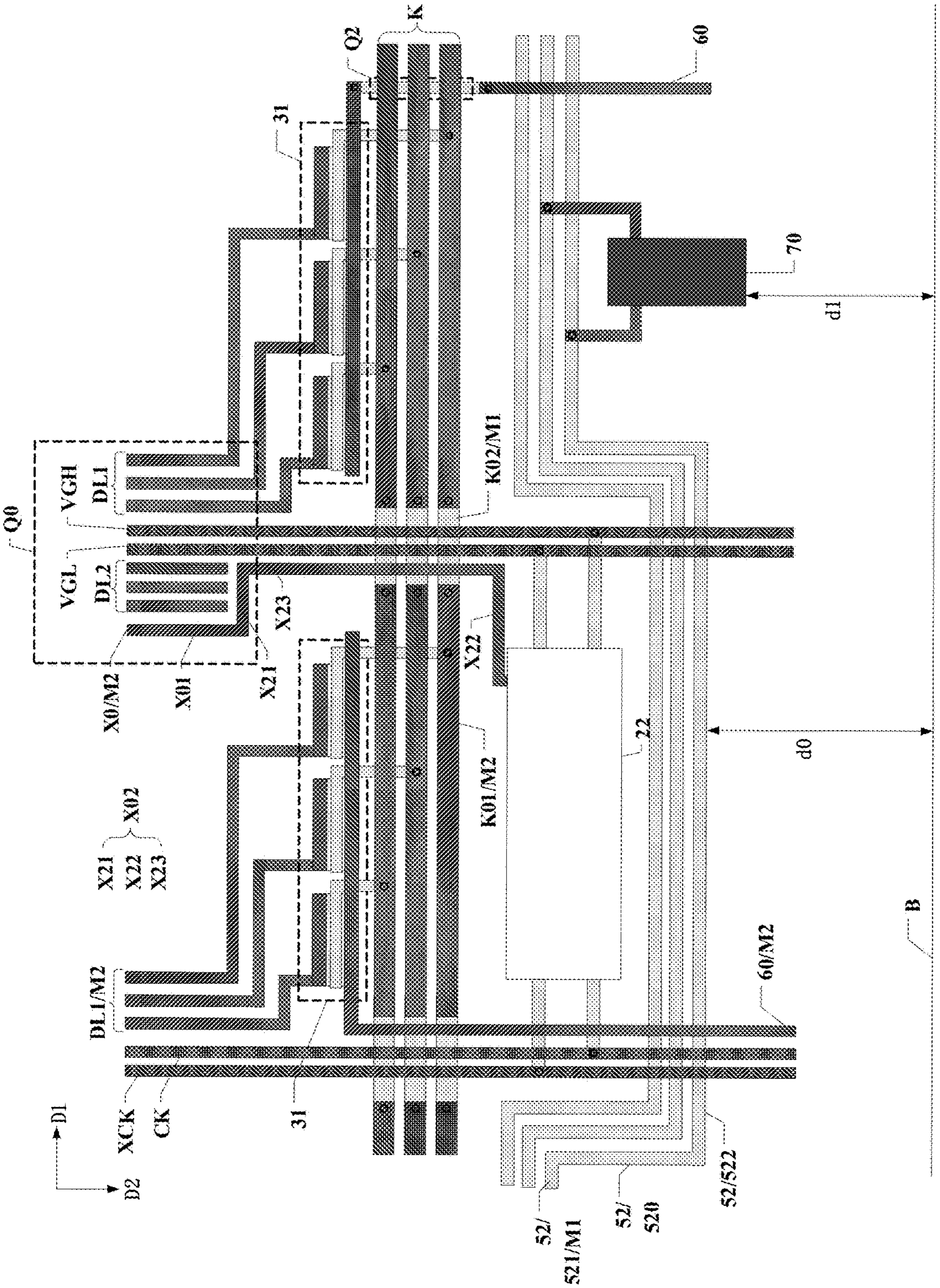
FIG. 16 illustrates a layout diagram of a pixel driving circuit array oriented toward one edge of a display panel in some embodiments of the present disclosure.

FIG. 16 illustrates a layout diagram of the side of the pixel driving circuit array 10 facing the edge B of the display panel in accordance with some embodiments of the present disclosure. It should be noted that FIG. 16 only schematically shows part of the layers in the display panel and does not show all layers. Referring to FIG. 16, in some embodiments of the present disclosure, the display panel further includes a second signal line 52 disposed between the electrostatic protection circuit 70 and the pixel driving circuit array 10. On the side of the pixel driving circuit array 10 facing the edge B of the display panel, the second signal line 52 extends along the first direction D1 as a whole and forms angled segments in some regions. For example, the second signal line 52 includes a first segment 521, a connecting segment 520, and a second segment 522, where the first segment 521, the connecting segment 520, and the second segment 522 are electrically connected in sequence and disposed in the same layer. The first segment 521 and the second segment 522 both extend along the first direction D1, while the connecting segment 520 extends along the second direction D2, with the first direction D1 intersecting the second direction D2. Along the first direction D1, at least part of the first segment 521 and the connecting segment 520 overlap with the second shift register 22, while the second segment 522 does not overlap with the second shift register 22.

Figure 17:
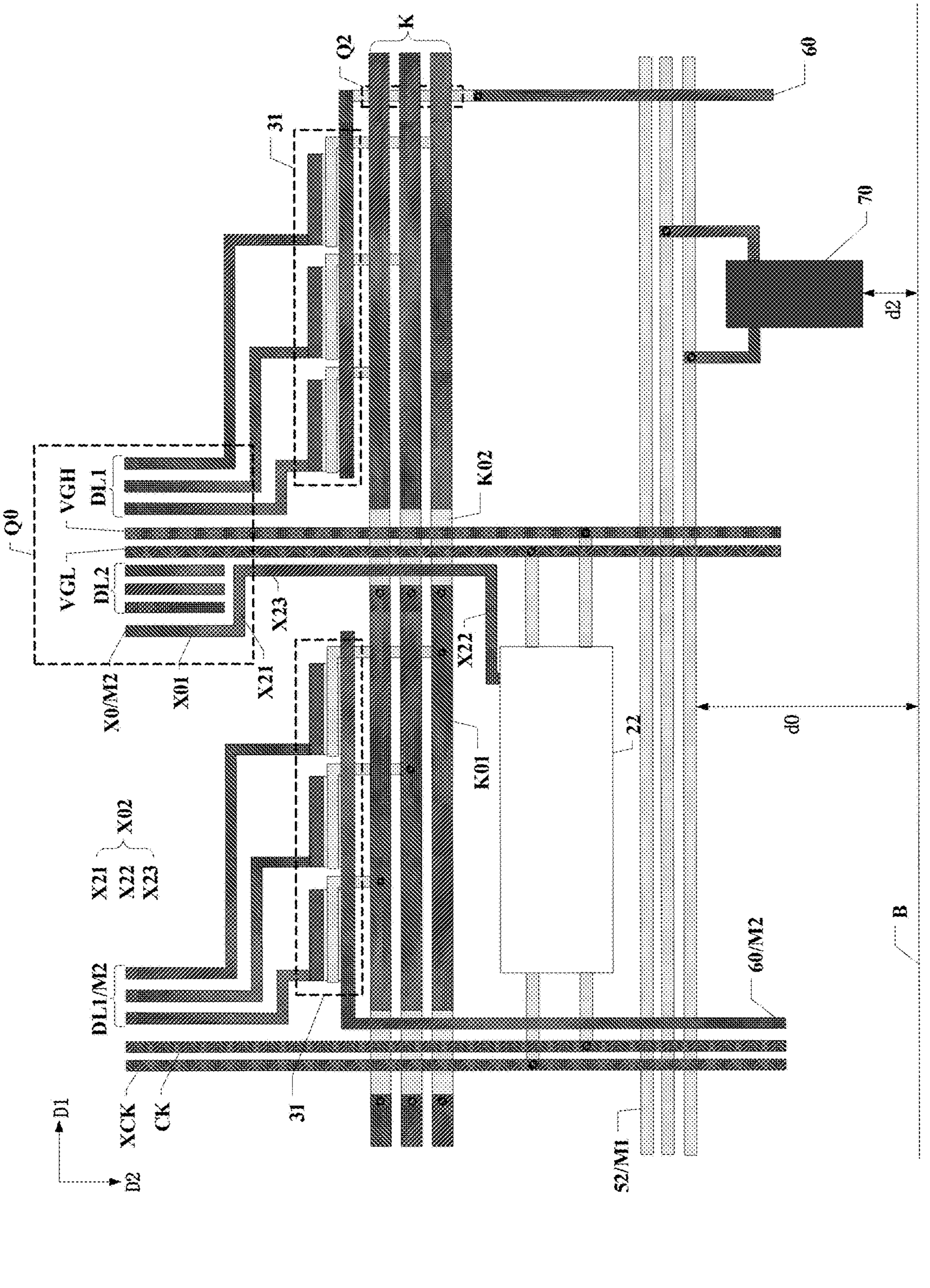
FIG. 17 illustrates a reference layout diagram of a pixel driving circuit array oriented toward one edge of a display panel.

Optionally, the second signal line 52 may include a power supply signal line providing a power signal to the electrostatic protection circuit and a detection signal line connecting the second shift register circuit to the test pad. The power supply signal line may also provide a power signal to the pixel driving circuit, allowing the power signal for the electrostatic protection circuit to be reused for the pixel driving circuit. It should be noted that FIG. 16 only schematically illustrates the wiring structure of the second signal line 52 and does not limit its actual quantity. When arranging the second signal line 52 on the side of the pixel driving circuit array facing the edge B of the display panel, as compared to setting the second signal line 52 as a straight line, the present embodiment makes reasonable use of the space along both sides of the second shift register 22 in the first direction D1. For example, referring to FIG. 16 in comparison with FIG. 17, FIG. 17 illustrates a reference layout diagram of the side of the pixel driving circuit array facing the edge B of the display panel. In FIG. 17, the gating circuit 30 is located on the side of the shift register circuit 20 facing the edge B of the display panel, and both the gating control lines and the second signal line 52 are disposed as straight-line structures extending along the first direction D1. As a result, the overall space occupied by both of the gating control lines and the second signal line 52 is relatively large. When the minimum distance d0 between the second signal line 52 and the edge B of the display panel is fixed, the layout in FIG. 17 places the electrostatic protection circuit 70 on the side of the second signal line 52 facing the edge B of the display panel, resulting in a smaller distance d2 between the electrostatic protection circuit 70 and the edge B of the display panel. During the cutting process to form the display panel, this increases the risk of the transistors in the electrostatic protection circuit 70 being damaged by the cutting laser. In the present embodiment, the arrangement of the gating circuit 30 and the second shift register 22 has been adjusted. The second shift register 22 is positioned on the side of the gating control line K in the gating circuit 30 facing the edge B of the display panel. On the side of the gating control line K facing the edge B of the display panel, the second shift registers 22 are arranged along the first direction D1, with spacing between adjacent second shift registers 22. This spacing may be used to layout segments of the second signal line 52, such as moving the first segment 521 and the connecting segment 520 into this space, effectively shifting parts of the second signal line 52 upward. After shifting these segments of the second signal line 52 upward, the electrostatic protection circuit 70 located on the side of the second signal line 52 facing the edge B of the display panel also gains upward space. When the minimum distance d0 between the second signal line 52 and the edge B of the display panel remains fixed, the distance d1 between at least part of the electrostatic protection circuit 70 and the edge B of the display panel can be increased, ensuring d1>d2, thus reducing the risk of the transistors in this part of the electrostatic protection circuit 70 being damaged by the cutting laser.

It should be noted that the distances between different electrostatic protection circuits 70 and the edge B of the display panel may vary. The distances between different electrostatic protection circuits 70 and the edge B of the display panel may be adjusted based on the actual wiring configuration, and the present disclosure does not specifically limit this.

Referring again to FIG. 15, in some embodiments of the present disclosure, the pixel driving circuit array 10 includes a plurality of pixel circuit column groups Z0 arranged along the first direction D1. A pixel circuit column group Z0 includes at least two pixel circuit columns. There is a spacing region Q0 between adjacent pixel circuit column groups Z0. Along the second direction D2, at least part of the electrostatic protection circuit 70 overlaps with the pixel circuit column groups Z0 but does not overlap with the spacing region Q0. The first direction D1 and the second direction D2 intersect, and the second direction D2 is the direction in which the pixel driving circuit array 10 points toward the second shift register 22.

Some signal lines located in the spacing region Q0 between the pixel circuit column groups Z0 extend toward the edge B region of the display panel and electrically connect to the bonding pad P1. These signal lines essentially occupy most of the lengthwise space of the display panel along the second direction D2. In some embodiments of the present disclosure, when the electrostatic protection circuit 70 is introduced on the side of the pixel driving circuit array 10 facing the edge B of the display panel, at least part of the electrostatic protection circuit 70 along the second direction D2 is configured to avoid overlapping with the spacing region Q0. Instead, the electrostatic protection circuit 70 is positioned directly below the column group of the pixel driving circuit 11. In this configuration, the electrostatic protection circuit 70 does not occupy the extending direction space of the spacing region Q0, thereby preventing interference with the signal lines in the spacing region Q0 that need to extend to the edge B region of the display panel to connect with the bonding pad P1. This avoids rerouting these signal lines to bypass the electrostatic protection circuit 70, simplifying the wiring process within the spacing region Q0.

Figure 18:
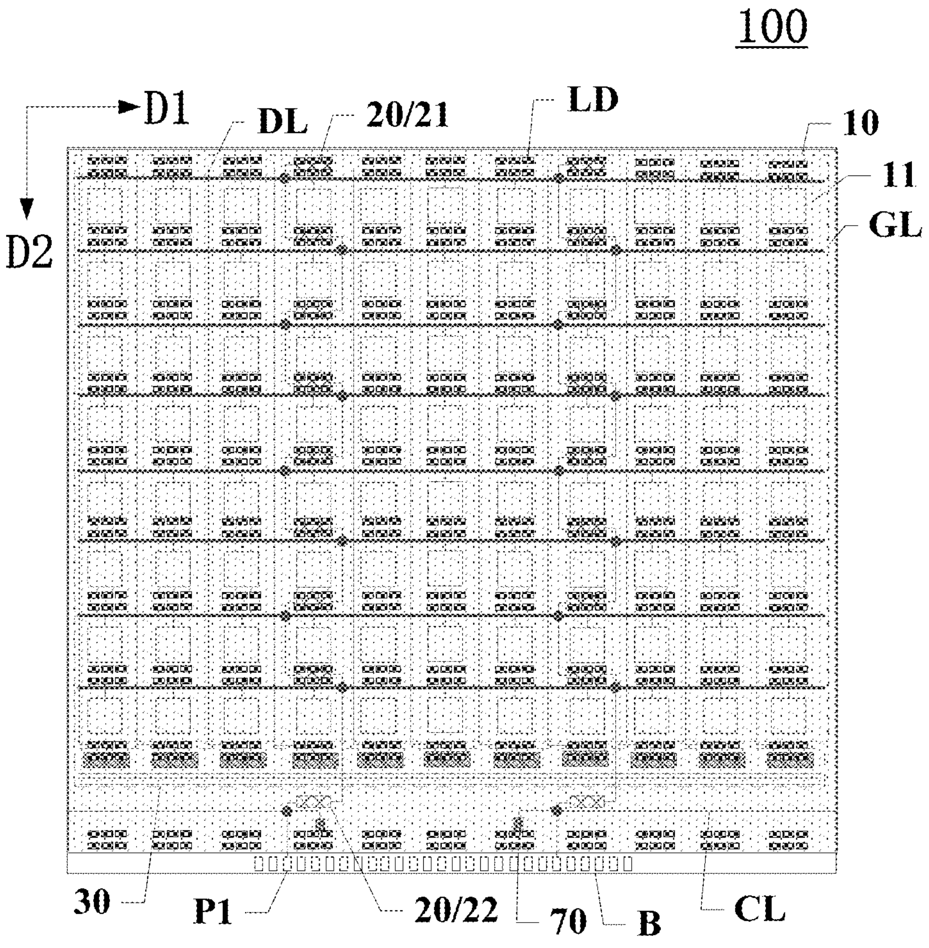
FIG. 18 illustrates a schematic layout diagram of a light-emitting element in accordance with some embodiments of the present disclosure.
Figure 19:
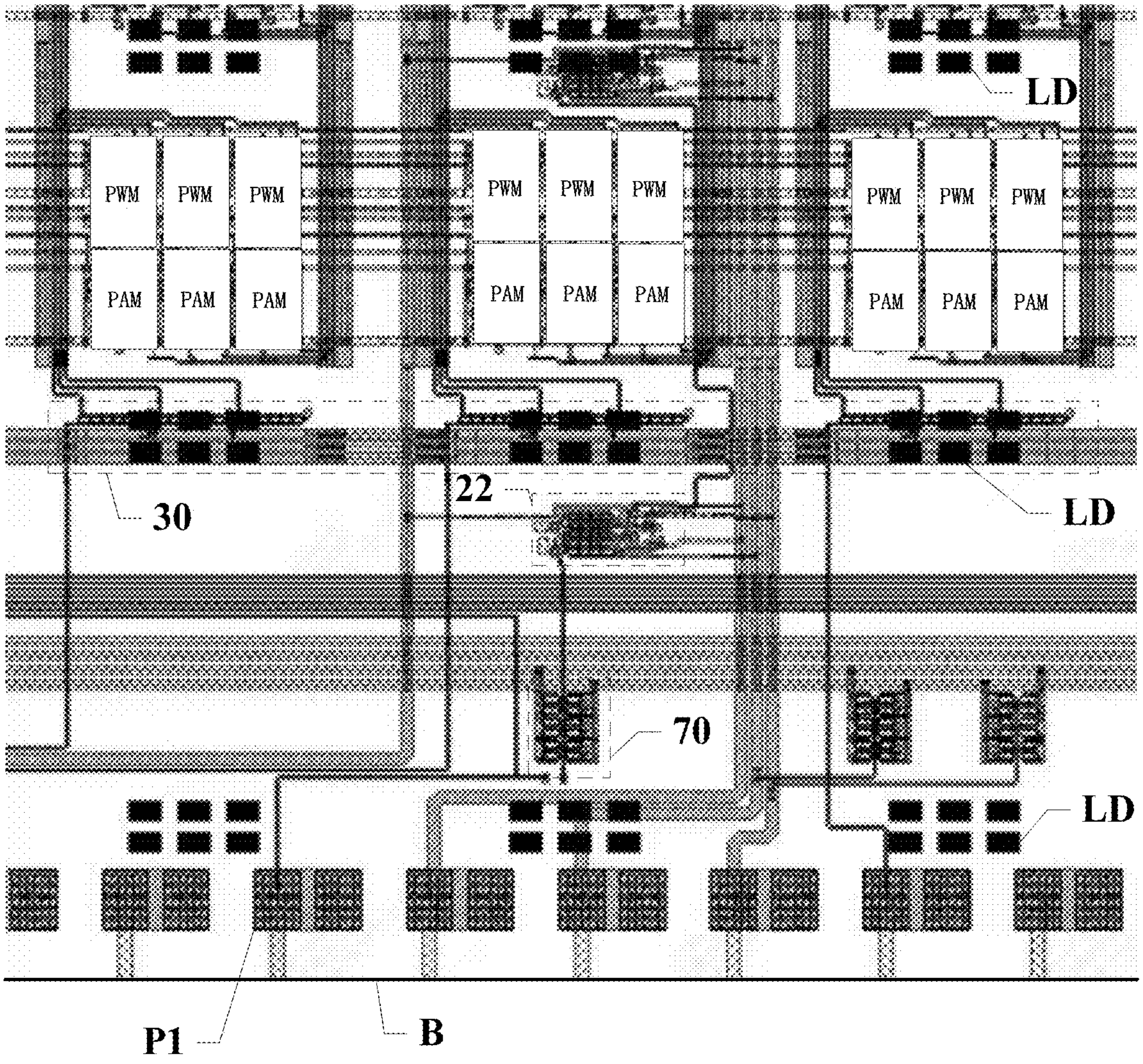
FIG. 19 illustrates a partial schematic layout diagram of a display panel.

FIG. 18 illustrates a schematic layout diagram of a light-emitting element LD in accordance with some embodiments of the present disclosure, and FIG. 19 illustrates a partial schematic layout diagram of the display panel. Referring to FIGS. 18 and 19, in some embodiments of the present disclosure, the display panel further includes a light-emitting element LD electrically connected to the pixel driving circuit 11. Optionally, the light-emitting elements LD are uniformly arranged in the display panel, with at least part of light-emitting elements LD located on the side of the pixel driving circuit array 10 facing the edge B of the display panel. It should be noted that FIG. 18 merely exemplifies an arrangement of light-emitting elements LD in the display panel and does not limit the actual number of light-emitting elements LD, the relative positional relationships between the light-emitting elements LD and the pixel driving circuits, or the corresponding numerical relationships between the light-emitting elements LD and the pixel driving circuits. Additionally, the light-emitting elements may include various colors, such as red, green, and blue light-emitting elements, and the present disclosure does not specifically limit this.

In the display panel, the area with light-emitting elements LD can be regarded as the display area. When the light-emitting elements LD are disposed on the side of the pixel driving circuit array 10 facing the edge B of the display panel, this side of the pixel driving circuit array 10 is also considered part of the display area. Such an arrangement increases the proportion of the display area in the display panel, enhancing the screen-to-body ratio and enabling extremely narrow bezels or even bezel-free designs. Since the pixel driving circuits 11 connected to the light-emitting elements LD are located in the pixel driving circuit array 10, the light-emitting elements LD on the side of the pixel driving circuit array 10 facing the edge B of the display panel can be electrically connected to the corresponding pixel driving circuits 11 through a signal line extending out of the pixel driving circuit array 10.

Referring again to FIGS. 18 and 19, in some embodiments of the present disclosure, at least part of the light-emitting elements LD overlap with the gating circuit 30 in the direction perpendicular to the plane of the display panel. Specifically, the light-emitting elements LD are disposed on the side of the gating circuit 30 facing the light-emitting surface of the display panel. This overlapping arrangement allows the area of the light-emitting elements LD to be reused with the area of the gating circuit 30, effectively utilizing the space of the display panel for arranging the light-emitting elements LD, thereby improving the space utilization of the display panel. Furthermore, by reusing the area of the light-emitting elements LD with that of the gating circuit 30, the gating circuit 30 is effectively placed in the display area, avoiding the need for the gating circuit 30 to occupy space in the non-display area. This contributes to achieving an extremely narrow bezel or even bezel-free design for the display panel.

Continuing with FIGS. 18 and 19, in some embodiments of the present disclosure, the display panel also includes an electrostatic protection circuit 70 disposed on the side of the pixel driving circuit array 10 facing the edge B of the display panel. At least part of the light-emitting elements LD are located on the side of the electrostatic protection circuit 70 facing the edge B of the display panel. This embodiment demonstrates a configuration where light-emitting elements LD are disposed on the side of the electrostatic protection circuit 70 away from the pixel driving circuit array 10, effectively placing light-emitting elements LD near the lower edge of the display panel. As such, the electrostatic protection circuit 70 is also integrated into the display area, without occupying space in the non-display area, further supporting the realization of an extremely narrow bezel or bezel-free design for the display panel.

In conjunction with FIGS. 11 and 18, in some embodiments of the present disclosure, the display panel further includes a first electrode P01 and a second electrode P02, where both the first electrode P01 and the second electrode P02 are electrically connected to the light-emitting elements LD. In the direction perpendicular to the light-emitting surface of the display panel, the first electrode P01 and the second electrode P02 are positioned on the side of the pixel driving circuit 11 facing the light-emitting surface of the display panel. The first electrode P01 is used to electrically connect with the pixel driving circuit 11, while the second electrode P02 is connected to a constant level signal line. When the pixel driving circuit 11 provides a driving current to the first electrode P01, the corresponding light-emitting elements LD is driven to emit light. Optionally, the first electrode P01 and the second electrode P02 may be located in the same layer of the display panel, or may be located in different layers, depending on the actual configuration, and the present disclosure does not specifically limit this. When the light-emitting elements LD are not directly above the corresponding pixel driving circuits 11, the pixel driving circuits 11 and the first electrodes P01 may be electrically connected through signal lines.

Figure 20:
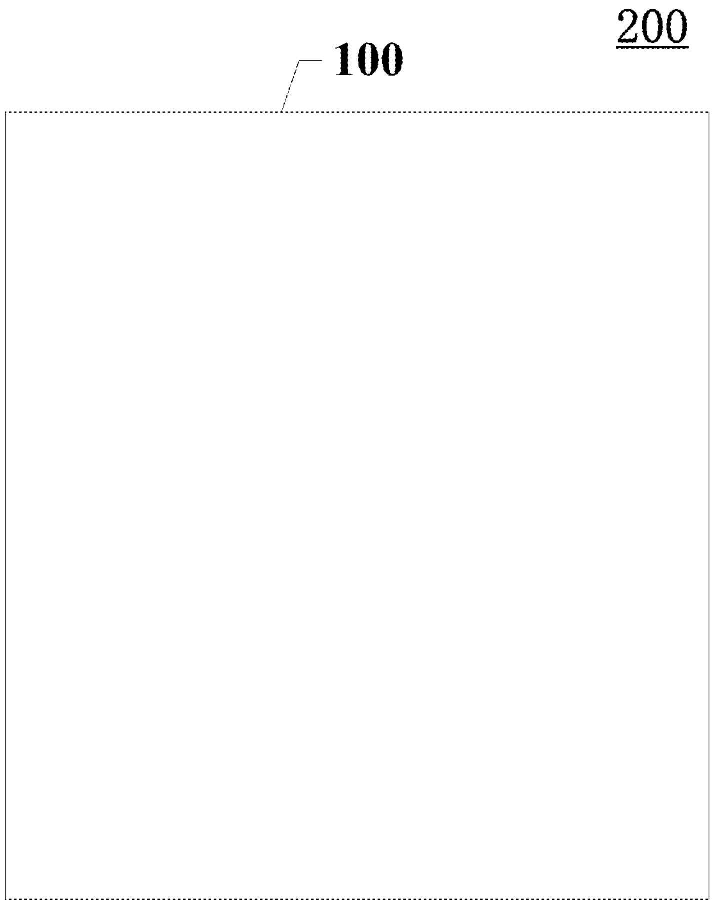
FIG. 20 illustrates a schematic structural diagram of a display device in accordance with some embodiments of the present disclosure.

The present disclosure further provides a display device. FIG. 20 illustrates a structural schematic diagram of a display device 200 in accordance with some embodiments of the present disclosure. Referring to FIG. 20, the display device 200 includes the display panel 100 described in any of the above embodiments. The display device 200 in accordance with some embodiments of the present disclosure may be any electronic device with a display function, such as a tablet computer with touch and display capabilities, a showcase display product, a television, or a vehicle-mounted display device. It is particularly suitable for display devices with extremely narrow bezels or bezel-free designs. The display device 200 in accordance with some embodiments of the present disclosure has the beneficial effects of the display panel 100 described in the present disclosure. Detailed descriptions of the display panel 100 in various embodiments can be referred to the above embodiments and will not be repeated here.

It is understandable that FIG. 20 merely provides a schematic representation of a rectangular structure for the display device. In some embodiments of the present disclosure, the display device 200 may also take other feasible shapes such as circular, oval, or any other configurations, and the present disclosure does not specifically limit this.

The technical solution in accordance with some embodiments of the present disclosure offers the following advantages compared to the prior art:

The present disclosure adjusts the positional relationship between the shift register circuit, the gating circuit, and the pixel driving circuit array. Specifically, a plurality of first shift registers in the shift register circuit are disposed within the region where the pixel driving circuit array is located, while the second shift register, which is cascaded with the first shift registers, is disposed outside the region where the pixel driving circuit array is located. That is, the second shift register is positioned on a side of the pixel driving circuit array facing an edge of the display panel. The edge mentioned in this embodiment refers to the lower edge of the display panel. At this time, the second shift register and the gating circuit are both located on the side of the pixel driving circuit array facing the edge of the display panel, with the second shift register positioned between the gating circuit and the edge of the display panel. In other words, the gating circuit is closer to the pixel driving circuit array compared to the second shift register and is therefore closer to the end of the data line. In this arrangement, when connecting the end of the data line to the gating circuit, it is not necessary to pass through the second shift register to establish the connection. This avoids signal interference from the second shift register on the data line and enhances the accuracy of the data signal transmitted over the data line. Additionally, by positioning the gating circuit between the second shift register and the pixel driving circuit array, there is no interference from other lines between the data line and the gating circuit. The data line is able to connect to the gating circuit without re-routing, thereby avoiding risks of disconnection or short circuits caused by re-routing the data line. This contributes to improving the display stability of the display panel.

It should be noted that relational terms such as "first" and "second" used herein are solely for the purpose of distinguishing one entity or operation from another and do not necessarily imply any actual relationship or order between such entities or operations. Furthermore, the terms "include," "comprise," or any variations thereof are intended to cover non-exclusive inclusion, such that a process, method, article, or apparatus that includes a list of elements does not necessarily include only those elements but may also include other elements not expressly listed or inherent to such process, method, article, or apparatus. Without further limitations, an element defined by the phrase "including a . . . " does not preclude the presence of additional identical elements in the process, method, article, or apparatus that includes the element.

The above description is merely specific embodiments of the present disclosure to enable those skilled in the art to understand or implement the present disclosure. Various modifications to these embodiments will be apparent to those skilled in the art. The general principles defined herein may be applied to other embodiments without departing from the spirit or scope of the present disclosure. Therefore, the present disclosure is not to be limited to the embodiments described herein but should be accorded the broadest scope consistent with the principles and novel features disclosed herein.

What is claimed is:

1. A display panel, comprising a pixel driving circuit array, a shift register circuit, a gating circuit, a pixel driving line, and a data line, wherein the pixel driving circuit array comprises a plurality of pixel driving circuits;

the pixel driving line and the data line are respectively electrically connected to the plurality of pixel driving circuits, the pixel driving line is configured to transmit a control signal to the plurality of pixel driving circuits, and the data line is configured to transmit a data signal to the plurality of pixel driving circuits;

the shift register circuit is configured to transmit the control signal to the pixel driving line, and the gating circuit is configured to transmit the data signal to the data line;

the shift register circuit comprises a plurality of shift registers that are cascaded, the plurality of shift registers comprising a plurality of first shift registers and a second shift register cascaded with the plurality of first shift registers, wherein the plurality of first shift registers are cascaded and located in a region where the pixel driving circuit array is located; and the second shift register is located on a side of the pixel driving circuit array facing an edge of the display panel; and the gating circuit is located between the pixel driving circuit array and the second shift register.

2. The display panel according to claim 1, further comprising a bonding pad and a test signal line, wherein an output terminal of the plurality of first shift registers is electrically connected to the plurality of pixel driving circuits through the pixel driving line, and an output terminal of the second shift register is electrically connected to the bonding pad; and the output terminal of the second shift register is also electrically connected to the test signal line.

3. The display panel according to claim 1, wherein the gating circuit comprises a plurality of switch element groups, wherein the plurality of switch element groups comprise at least two switch elements, and an output terminal of the at least two switch elements is electrically connected to the data line; and the data line comprises a first portion and a second portion, wherein the first portion and the second portion are electrically connected and disposed in a same layer, the first portion is at least located in the region where the pixel driving circuit array is located, the second portion is located on the side of the pixel driving circuit array facing the edge of the display panel, and the first portion is electrically connected to the at least two switch elements through the second portion.

4. The display panel according to claim 3, wherein the gating circuit comprises at least two gating control lines, and within a same switch element group, gates of different switch elements are connected to different gating control lines of the at least two gating control lines, wherein the at least two gating control lines extend along a first direction, the first portion extends along a second direction, and the first direction intersects with the second direction;

along the second direction, the plurality of switch element groups are located between the at least two gating control lines and the pixel driving circuit array; and a line width of the at least two gating control lines is greater than a line width of the first portion.

5. The display panel according to claim 4, wherein the second shift register are electrically connected to the plurality of first shift registers through a level transmission signal line; and along a direction perpendicular to a plane of the display panel, the level transmission signal line overlaps with the at least two gating control lines to form a first overlapping region, wherein in the first overlapping region, the level transmission signal line and the at least two gating control lines are disposed in different layers.

6. The display panel according to claim 5, wherein the at least two gating control lines comprise a body portion and a crossover portion connected to the body portion;

the body portion and the crossover portion are disposed in different layers, and both extend along the first direction;

at least a part of the crossover portion is located in the first overlapping region; and the level transmission signal line and the body portion are disposed in a same layer.

7. The display panel according to claim 6, comprising a substrate, a first metal layer, and a second metal layer, wherein the first metal layer and the second metal layer are both disposed on the substrate, and a resistivity of the second metal layer is less than a resistivity of the first metal layer; and the body portion of the at least two gating control lines and the level transmission signal line are located in the second metal layer, and the crossover portion of the at least two gating control lines is located in the first metal layer.

8. The display panel according to claim 6, wherein along the first direction, the crossover portion is located between adjacent switch element groups of the plurality of switch element groups;

along the second direction, the second shift register overlaps with the plurality of switch element groups; and along the first direction, the level transmission signal line connected to the second shift register, is located on a same side as the second shift register and the plurality of switch element groups corresponding to the second shift register.

9. The display panel according to claim 8, wherein the level transmission signal line comprises a main portion and a bypass portion electrically connected to the main portion, wherein the main portion is located in the region where the pixel driving circuit array is located, and extends along the second direction;

along the second direction, the bypass portion is located on the side of the pixel driving circuit array facing the edge of the display panel;

the bypass portion is electrically connected to the second shift register; and the bypass portion comprises a first bypass line, a connection portion, and a second bypass line, wherein the first bypass line, the connection portion, and the second bypass line are sequentially electrically connected;

the first bypass line and the second bypass line both extend along the first direction;

the connection portion extends along the second direction;

the first bypass line is connected to the main portion; and the second bypass line is connected to the second shift register.

10. The display panel according to claim 6, wherein the pixel driving circuit array comprises a plurality of pixel circuit column groups arranged along the first direction, wherein the plurality of pixel circuit column groups comprise at least two pixel circuit columns;

a spacing region is provided between adjacent pixel circuit column groups of the plurality of pixel circuit column groups; and along the second direction, the crossover portion overlaps with the spacing region.

11. The display panel according to claim 10, further comprising a plurality of first signal lines, wherein the plurality of first signal lines extend along the second direction;

the plurality of first signal lines are configured to provide a signal to the shift register circuit;

the plurality of first signal lines are located on at least one side of the shift register circuit along the first direction, and are positioned within the spacing region;

along a direction perpendicular to a plane of a light-emitting surface of the display panel, the plurality of first signal lines overlap with the crossover portion, but do not overlap with the body portion; and the plurality of first signal lines are disposed in a same layer as the body portion.

12. The display panel according to claim 11, wherein the data line comprises a first type of data line and a second type of data line corresponding to the plurality of pixel circuit column groups, wherein the first type of data line and the second type of data line are both electrically connected to the plurality of pixel driving circuits;

the first type of data line is further electrically connected to the gating circuit; and along the first direction, the first type of data line and the second type of data line are located on opposite sides of the plurality of pixel circuit column groups corresponding, and the level transmission signal line and the second type of data line are located in a same spacing region.

13. The display panel according to claim 6, wherein input terminals of different switch elements in the same switch element group are connected to a same input line;

along a direction perpendicular to a light-emitting surface of the display panel, at least a portion of an input line corresponding to the plurality of switch element groups overlaps with the crossover portion of the at least two gating control lines; and the input line is disposed in a same layer as the body portion of the at least two gating control lines.

14. The display panel according to claim 6, wherein input terminals of different switch elements in the same switch element group are connected to a same input line;

along a direction perpendicular to a light-emitting surface of the display panel, at least a portion of an input line corresponding to the plurality of switch element groups overlaps with the body portion of the at least two gating control lines to form a second overlapping region; and in the second overlapping region, the input line is disposed in a same layer as the crossover portion of the at least two gating control lines.

15. The display panel according to claim 14, wherein a line width of the body portion in the second overlapping region is less than or equal to a line width of the body portion in other regions; and/or, the body portion further comprises a first opening, and the first opening is at least located in the second overlapping region along the direction perpendicular to the plane of the display panel.

16. The display panel according to claim 6, wherein a gate of the at least two switch elements is electrically connected to the at least two gating control lines through a gate connection line, and the gate connection line extends along the second direction;

along a direction perpendicular to a plane of a light-emitting surface of the display panel, at least one gate connection line overlaps with the body portion to form a third overlapping region;

a line width of the body portion in the third overlapping region is less than or equal to a line width of the body portion in other regions; and/or, the body portion further comprises a second opening, and the second opening is at least located in the third overlapping region along the direction perpendicular to the plane of the display panel.

17. The display panel according to claim 1, wherein the pixel driving circuit array comprises a plurality of pixel circuit column groups arranged along a first direction, wherein the plurality of pixel circuit column groups comprise at least two pixel circuit columns, and a spacing region is located between adjacent pixel circuit column groups of the plurality of pixel circuit column groups;

along a second direction, the shift register circuit and the gating circuit both overlap with the plurality of pixel circuit column groups, wherein the first direction and the second direction intersect, and the second direction is a direction in which the pixel driving circuit array points toward the second shift register; and along the second direction, the plurality of first shift registers and the second shift register do not overlap with the spacing region.

18. The display panel according to claim 1, comprising an electrostatic protection circuit and a second signal line, wherein the electrostatic protection circuit is located on the side of the pixel driving circuit array facing the edge of the display panel, and at least a portion of the electrostatic protection circuit is electrically connected to the second shift register; and the second signal line is disposed between the electrostatic protection circuit and the pixel driving circuit array, and comprises a first segment, a connecting segment, and a second segment, wherein the first segment, the connecting segment, and the second segment are electrically connected in sequence and disposed in a same layer;

the first segment and the second segment both extend along a first direction, and the connecting segment extends along a second direction, wherein the first direction and the second direction intersect; and along the first direction, at least a portion of the first segment and the connecting segment overlap with the second shift register, and the second segment does not overlap with the second shift register.

19. The display panel according to claim 18, wherein the second signal line comprises a power signal line and at least one detection signal line, wherein the power signal line is configured to provide a power signal to the plurality of pixel driving circuits, and the at least one detection signal line is configured to be electrically connected to an output terminal of the second shift register; or the pixel driving circuit array comprises a plurality of pixel circuit column groups arranged along the first direction, the plurality of pixel circuit column groups comprise at least two pixel circuit columns, and a spacing region is located between adjacent pixel circuit column groups, wherein along the second direction, at least a portion of the electrostatic protection circuit overlaps with the plurality of pixel circuit column groups, and does not overlap with the spacing region; and the first direction and the second direction intersect, and the second direction is a direction in which the pixel driving circuit array points toward the second shift register.

20. A display device, comprising a display panel, wherein the display panel comprises a pixel driving circuit array, a shift register circuit, a gating circuit, a pixel driving line, and a data line;

the pixel driving circuit array comprises a plurality of pixel driving circuits;

the pixel driving line and the data line are respectively electrically connected to the plurality of pixel driving circuits, the pixel driving line is configured to transmit a control signal to the plurality of pixel driving circuits, and the data line is configured to transmit a data signal to the plurality of pixel driving circuits;

the shift register circuit is configured to transmit the control signal to the pixel driving line, and the gating circuit is configured to transmit the data signal to the data line;

the shift register circuit comprises a plurality of shift registers that are cascaded, the plurality of shift registers comprising a plurality of first shift registers and a second shift register cascaded with the plurality of first shift registers, wherein the plurality of first shift registers are cascaded and located in a region where the pixel driving circuit array is located; and the second shift register is located on a side of the pixel driving circuit array facing an edge of the display panel; and the gating circuit is located between the pixel driving circuit array and the second shift register.

* * * * *